(12) United States Patent
Elias

(10) Patent No.: US 11,526,068 B2
(45) Date of Patent: *Dec. 13, 2022

(54) CAMERA SUPPORTING BASE

(71) Applicant: James Harrison Elias, Kolbermoor (DE)

(72) Inventor: James Harrison Elias, Kolbermoor (DE)

(*) Notice: Subject to any disclaimer, the term of this patent is extended or adjusted under 35 U.S.C. 154(b) by 0 days.

This patent is subject to a terminal disclaimer.

(21) Appl. No.: 17/166,259

(22) Filed: Feb. 3, 2021

(65) Prior Publication Data

US 2021/0232025 A1    Jul. 29, 2021

Related U.S. Application Data

(62) Division of application No. 16/819,051, filed on Mar. 14, 2020, now Pat. No. 11,016,369, which is a division of application No. 16/045,921, filed on Jul. 26, 2018, now Pat. No. 10,642,131, which is a
(Continued)

(51) Int. Cl.
*G03B 17/56* (2021.01)
*F16M 13/02* (2006.01)
*F16M 11/24* (2006.01)
*F16M 11/14* (2006.01)
*F16M 11/22* (2006.01)

(52) U.S. Cl.
CPC .......... *G03B 17/561* (2013.01); *F16M 11/14* (2013.01); *F16M 11/22* (2013.01); *F16M 11/242* (2013.01); *F16M 13/02* (2013.01); *F16M 13/022* (2013.01); *F16M 2200/041* (2013.01); *F16M 2200/08* (2013.01)

(58) Field of Classification Search
None
See application file for complete search history.

(56) References Cited

U.S. PATENT DOCUMENTS

| 148,600 A | 3/1874 | Donn |
|---|---|---|
| 2,357,165 A | 2/1944 | Brady |
| 3,463,437 A | 8/1969 | Henderson |

(Continued)

FOREIGN PATENT DOCUMENTS

| CN | 205824551 | 12/2016 |
|---|---|---|
| DE | 20005216 | 9/2000 |

(Continued)

OTHER PUBLICATIONS

Foba Base Plate for Tripod Heads, https://www.bhphotovideo.com/c/product/17972-REG/Foba_BALGO_Base_Plate.html, Nov. 25, 2008.

(Continued)

*Primary Examiner* — Rodney E Fuller
(74) *Attorney, Agent, or Firm* — Michael J. Nickerson; Basch & Nickerson LLP

(57) ABSTRACT

A camera supporting base includes a mounting platform with a mounting surface, a lower surface, and a recess area. The mounting surface is raised above and non-coplanar with the lower surface of the mounting platform. The camera supporting base also includes a pliable mass surrounding the mounting platform. The mounting surface of the mounting platform is recessed below a highest contour of the pliable mass.

9 Claims, 25 Drawing Sheets

Related U.S. Application Data division of application No. 15/616,195, filed on Jun. 7, 2017, now Pat. No. 10,067,409.

(60) Provisional application No. 62/453,622, filed on Feb. 2, 2017.

(56) References Cited

U.S. PATENT DOCUMENTS

| | | |
|---|---|---|
| D221,634 S | 8/1971 | Bradspies et al. |
| D239,395 S | 3/1976 | David |
| 4,152,696 A | 7/1979 | Sprung |
| 4,355,777 A | 10/1982 | Greenstreet |
| 4,501,401 A | 2/1985 | Conee |
| 4,516,767 A | 5/1985 | Eskijian |
| 4,570,886 A | 2/1986 | Mooney |
| 4,606,524 A | 8/1986 | Conee |
| 4,788,916 A | 12/1988 | Saxton |
| 4,852,636 A | 8/1989 | Kawazoe |
| D310,677 S | 9/1990 | Stidham, Jr. et al. |
| D312,660 S | 12/1990 | Charrier |
| 5,064,062 A | 11/1991 | Miller |
| 5,350,147 A | 9/1994 | Paganus |
| 5,458,306 A | 10/1995 | O'Farrill et al. |
| D395,641 S | 6/1998 | Gaete |
| 5,810,313 A | 9/1998 | Armstrong |
| 5,924,661 A | 7/1999 | Chernack |
| 6,073,902 A | 6/2000 | Hiles |
| D427,572 S | 7/2000 | Solomon et al. |
| 6,315,120 B1 | 11/2001 | Tally et al. |
| 6,330,992 B1 | 12/2001 | Swayhoover et al. |
| 6,371,345 B1 | 4/2002 | Leyen et al. |
| 6,439,530 B1 | 8/2002 | Schoenfish et al. |
| D480,376 S | 10/2003 | Ma |
| 6,755,380 B2 | 6/2004 | Pace |
| 7,140,622 B1 | 11/2006 | Cantu |
| 7,403,613 B2 | 7/2008 | Liou |
| D575,289 S | 8/2008 | Kuo et al. |
| D588,392 S | 3/2009 | Yang et al. |
| 7,581,703 B1 | 9/2009 | Coleman et al. |
| 7,682,543 B2 | 3/2010 | Carnevall |
| 7,690,614 B1 | 4/2010 | Mudd et al. |
| D629,806 S | 12/2010 | Ho et al. |
| 7,988,106 B2 | 8/2011 | Carnevall |
| 7,992,831 B2 | 8/2011 | Fan |
| D657,795 S | 4/2012 | Smith et al. |
| D670,704 S | 11/2012 | Barker |
| D680,121 S | 4/2013 | Yamamoto |
| D687,833 S | 8/2013 | Gittins |
| D688,252 S | 8/2013 | Paul |
| 8,544,640 B1 | 10/2013 | Hilton |
| D703,674 S | 4/2014 | Zito et al. |
| D706,333 S | 6/2014 | Chun |
| D706,855 S | 6/2014 | Matsumoto et al. |
| 8,747,418 B2 | 6/2014 | Qureshi et al. |
| D719,961 S | 12/2014 | Xiang et al. |
| D725,660 S | 3/2015 | Trotsky |
| D731,496 S | 6/2015 | Voorhees |
| D739,857 S | 9/2015 | Lay et al. |
| D748,639 S | 2/2016 | Khodapanah et al. |
| D757,835 S | 5/2016 | Tabuchi |
| D773,325 S | 12/2016 | Browning et al. |
| D797,749 S | 9/2017 | Awad et al. |
| D827,622 S | 9/2018 | Baiz et al. |
| 10,067,409 B2 * | 9/2018 | Elias .............. F16M 13/022 |
| D832,589 S | 11/2018 | Charlesworth et al. |
| 10,223,885 B2 | 3/2019 | Larsson et al. |
| D846,554 S | 4/2019 | Burmester |
| D851,651 S | 6/2019 | Elias et al. |
| D852,204 S | 6/2019 | Elias et al. |
| 10,330,467 B2 | 6/2019 | Rueb |
| D855,620 S | 8/2019 | Elias et al. |
| D855,621 S | 8/2019 | Elias et al. |
| D855,622 S | 8/2019 | Elias et al. |
| D855,623 S | 8/2019 | Elias et al. |
| D855,624 S | 8/2019 | Elias et al. |
| D855,625 S | 8/2019 | Elias et al. |
| D855,626 S | 8/2019 | Elias et al. |
| D855,627 S | 8/2019 | Elias et al. |
| D855,628 S | 8/2019 | Elias et al. |
| D856,342 S | 8/2019 | Elias et al. |
| D857,024 S | 8/2019 | Elias et al. |
| D857,699 S | 8/2019 | Elias et al. |
| D861,699 S | 10/2019 | Elias et al. |
| D861,700 S | 10/2019 | Elias et al. |
| 10,642,131 B2 | 5/2020 | Elias |
| 2003/0102419 A1 | 6/2003 | Carnevali |
| 2007/0152117 A1 | 7/2007 | Byrd |
| 2007/0290104 A1 | 12/2007 | Denison et al. |
| 2008/0203263 A1 | 8/2008 | Carnevall |
| 2009/0108169 A1 | 4/2009 | Fan |
| 2009/0242719 A1 | 10/2009 | Carnevali |
| 2010/0193649 A1 | 8/2010 | Wiegers |
| 2010/0287610 A1 | 11/2010 | Joffray |
| 2012/0070141 A1 | 3/2012 | Scholz et al. |
| 2012/0255982 A1 | 10/2012 | Craig |
| 2014/0054426 A1 | 2/2014 | Burns |
| 2014/0325818 A1 | 11/2014 | Mayfield |
| 2018/0080601 A1 | 3/2018 | Bosnakovic |

FOREIGN PATENT DOCUMENTS

| | | |
|---|---|---|
| DE | 102008061036 | 6/2010 |
| DE | 202011108150 | 2/2012 |
| EP | 1026531 B1 | 3/2006 |
| EP | 2520845 | 12/2013 |
| EP | 1491986 | 12/2014 |
| GB | 622680 | 5/1949 |
| GB | 1136159 | 12/1968 |
| GB | 2359144 | 8/2001 |
| GB | 2432223 | 6/2007 |
| GB | 2457440 | 8/2009 |
| GB | 2472820 | 2/2011 |
| JP | 2000193191 A | 7/2000 |
| KR | 20140003550 | 6/2014 |
| WO | WO199811380 | 3/1998 |
| WO | WO200061336 | 10/2000 |
| WO | WO2007077430 | 7/2007 |
| WO | WO2007086089 | 8/2007 |
| WO | WO2017099606 | 6/2017 |
| WO | WO2017178942 | 10/2017 |

OTHER PUBLICATIONS

Manfrotto 241 B Pump Cup with Flat Base—for Lightweight Equipment, https://www.bhphotovideo.com (review dated Dec. 10, 2016).

PANAVISE NoSKID DashMount—Weighted Dashboard Mount, https://www.bhphotovideo.com (review dated Aug. 3, 2016).

ECKLASPHERE Swing Tripod, http://www.eckla.de/en/ecklasphere-swing-tripod.html, (www.archive.org date of Dec. 13, 2016).

International Search Report (PCT/US2018/016542) dated Jun. 5, 2018 dated 2018.

International Search Report (PCT/US2018/035268) dated Oct. 31, 2018 dated Oct. 31, 2018.

International Search Report (PCT/US2018/016542) dated Jun. 5, 2018 dated Jun. 5, 2018.

International Prelimnary Examination Report (PCT/US2018/016542) dated Aug. 15, 2019 dated Aug. 15, 2019.

OctoPad XL—Bundle with Manfrotto Universal Clamp. [online] Published Feb. 28, 2019. Retrieved Oct. 30, 2019 from URL: https:// www.arnazon.com/OCTOPUS-CAMERA-OctoPad-XL-Manfrotto-Universal/dp/B07P62RCG5/ref=sr1 47?keywords=octopad &gid= 1572463898&sr=8-47 Oct. 30, 2019.

International Preliminary Examination Report for PCT/US18/035268 dated Dec. 12, 2019.

* cited by examiner

CAMERA SUPPORTING BASE

PRIORITY INFORMATION

The present application is a divisional of co-pending U.S. patent application Ser. No. 16/819,051, filed on Mar. 14, 2020; said U.S. patent application Ser. No. 16/819,051, filed on Mar. 14, 2020, claiming priority, under 35 U.S.C. § 120, from U.S. patent application Ser. No. 16/045,921, filed on Jul. 26, 2018; said U.S. patent application Ser. No. 16/045,921, filed on Jul. 26, 2018, claiming priority, under 35 U.S.C. § 120, from U.S. patent application Ser. No. 15/616,195, filed on Jun. 7, 2017, (now U.S. Pat. No. 10,067,409); said U.S. patent application Ser. No. 15/616,195, filed on Jun. 7, 2017, (now U.S. Pat. No. 10,067,409) claiming priority, under 35 U.S.C. § 119(e), from 62/453,622, filed on Feb. 2, 2017. The entire content of U.S. patent application Ser. No. 16/819,051, filed on Mar. 14, 2020, is hereby incorporated by reference. The entire content of U.S. patent application Ser. No. 16/045,921, filed on Jul. 26, 2018, is hereby incorporated by reference. The entire content of U.S. patent application Ser. No. 15/616,195, filed on Jun. 7, 2017, (now U.S. Pat. No. 10,067,409), is hereby incorporated by reference.

The present application claims priority, under 35 USC § 120, from U.S. patent application Ser. No. 16/819,051, filed on Mar. 14, 2020. The present application claims priority, under 35 USC § 120, from U.S. patent application Ser. No. 16/045,921, filed on Jul. 26, 2018. The present application claims priority, under 35 USC § 120, from U.S. patent application Ser. No. 15/616,195, filed on Jun. 7, 2017, (now U.S. Pat. No. 10,067,409).

This application claims priority, under 35 U.S.C. § 119(e), from U.S. Provisional Patent Application, Ser. No. 62/453,622, filed on Feb. 2, 2017. The entire content of U.S. Provisional Patent Application, Ser. No. 62/453,622, filed on Feb. 2, 2017, is hereby incorporated by reference.

BACKGROUND

The stable positioning of videographic cameras upon irregular surfaces, especially when additionally under conditions of vibration and movement, presents pronounced challenges.

Conventional supporting under such conditions has relied upon substantial bulk and weight of the camera itself to assure stability and facilitate positioning for desired image framing.

However, in many cases, it is desirable to use compact cameras, such as used in sports videography or such as integrated into mobile telephones, due to their high image quality, while remaining small, light and convenient to carry.

Since conventional compact cameras have low intrinsic bulk and mass, the conventional compact cameras have less inherent stability resulting from gravity. Moreover, conventionally, such compact cameras have often used rigidly anchored supporting devices, requiring disadvantageous time and effort for repositioning.

Furthermore, the ability to use a supplementary positioning device, such as a ball head, upon which the camera is mounted, is of great advantage.

This supplemental positioning device, with respect to compact cameras, presents a disadvantage in that it adds height, thus decreasing stability of the compact cameras and hindering use in small spaces.

In addition, the positional clamping activating element of a ball head conventionally protrudes below the mounting surface of the head, thereby rendering the mounting to a flat or nearly flat surface infeasible without jamming or impeding the movement of the positional clamping activating element.

Therefore, it is desirable to provide a camera supporting base that offers a low surface for mounting of the camera or camera positioning device, while still remaining stable under conditions of vibration or movement without requiring rigid anchoring.

It is further desirable to provide a camera supporting base that uses purposeful contouring in the area of the mounting surface to prevent collision with or impeding of the elements that protrude below the mounting surface.

BRIEF DESCRIPTION OF THE DRAWINGS

The drawings are only for purposes of illustrating various embodiments and are not to be construed as limiting, wherein.

DETAILED DESCRIPTION

Figure 1:
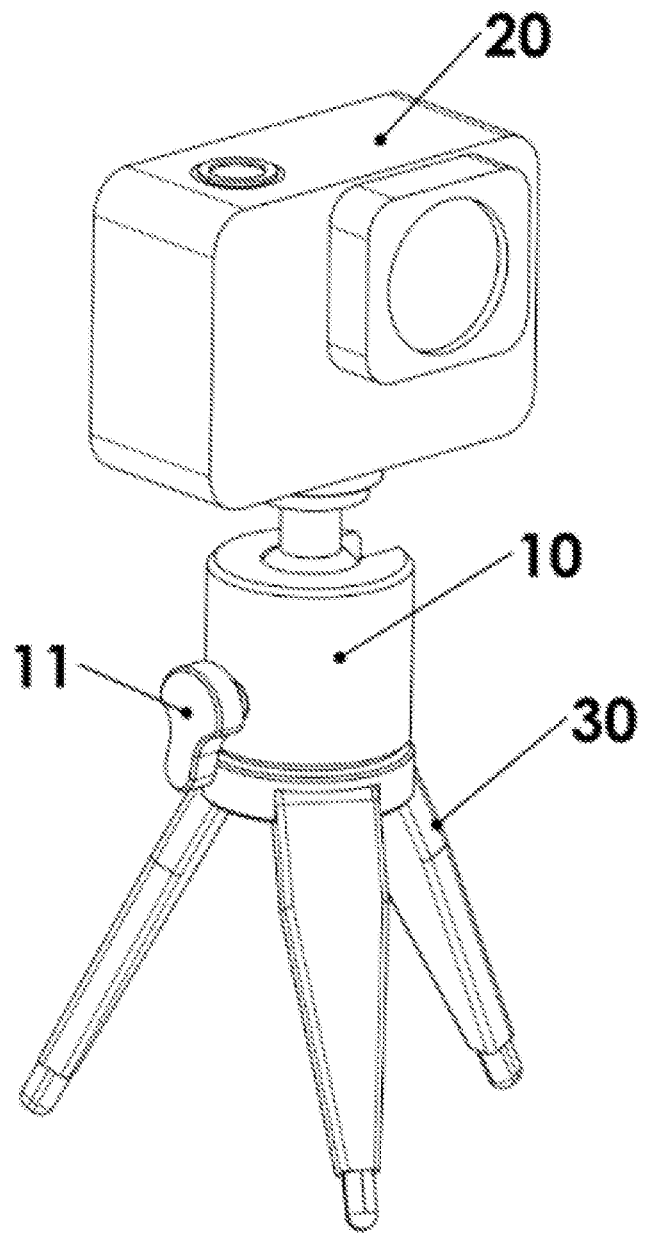
FIG. 1 shows a front perspective view of a compact camera mounted on a positionable ball head, mounted on a tripod.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

FIG. 1 shows a compact camera 20 mounted upon a positionable ball head 10 having a positioning clamp lever 11. The positionable ball head 10 is mounted upon a compact tripod 30.

In order to allow for ergonomic form and size of the positioning clamp lever 11 without disadvantageously increasing the height of the positionable ball head 10, the positioning clamp lever 11 protrudes below the base of the positionable ball head 10.

It is noted that the compact tripod 30 lacks the weight and footprint necessary to assure stability under conditions of vibration and movement.

Figure 2:
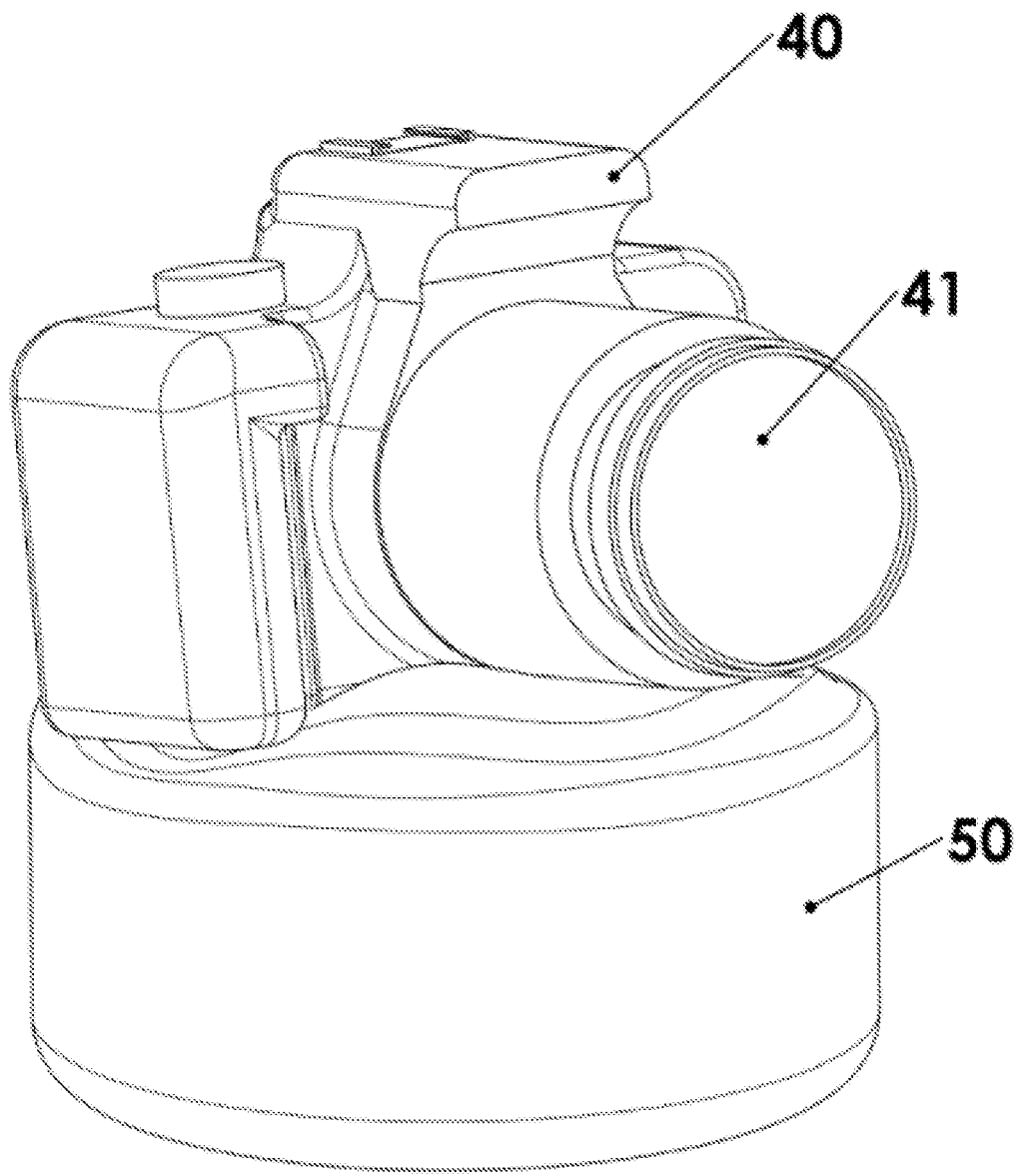
FIG. 2 shows a front perspective view of a reflex-type non-compact camera mounted on a pliable cushion.

FIG. 2 illustrates use of a video-capable reflex-type camera 40 with a lens 41 mounted on a pliable cushion 50. The weights and surface areas of the reflex-type camera 40 and the lens 41 are used to form the pliable cushion 50 to allow for positioning of the reflex-type camera 40 as desired.

If a compact camera 20 was mounted directly upon the pliable cushion 50, the low weight and small surface area of the compact camera 20 would make it infeasible to optimally form the pliable cushion 50 for desired positioning.

If the positionable ball head 10 was mounted between the camera 20 and the pliable cushion 50 to assist in positioning, collision between the positioning clamp lever 11 and the pliable cushion 50 would occur.

Furthermore, if the positionable ball head 10 was mounted upon the pliable cushion 50, it would be disadvantageous as the total height of the build would be the sum of the full heights of the pliable cushion 50 and the positionable ball head 10.

Figure 3:
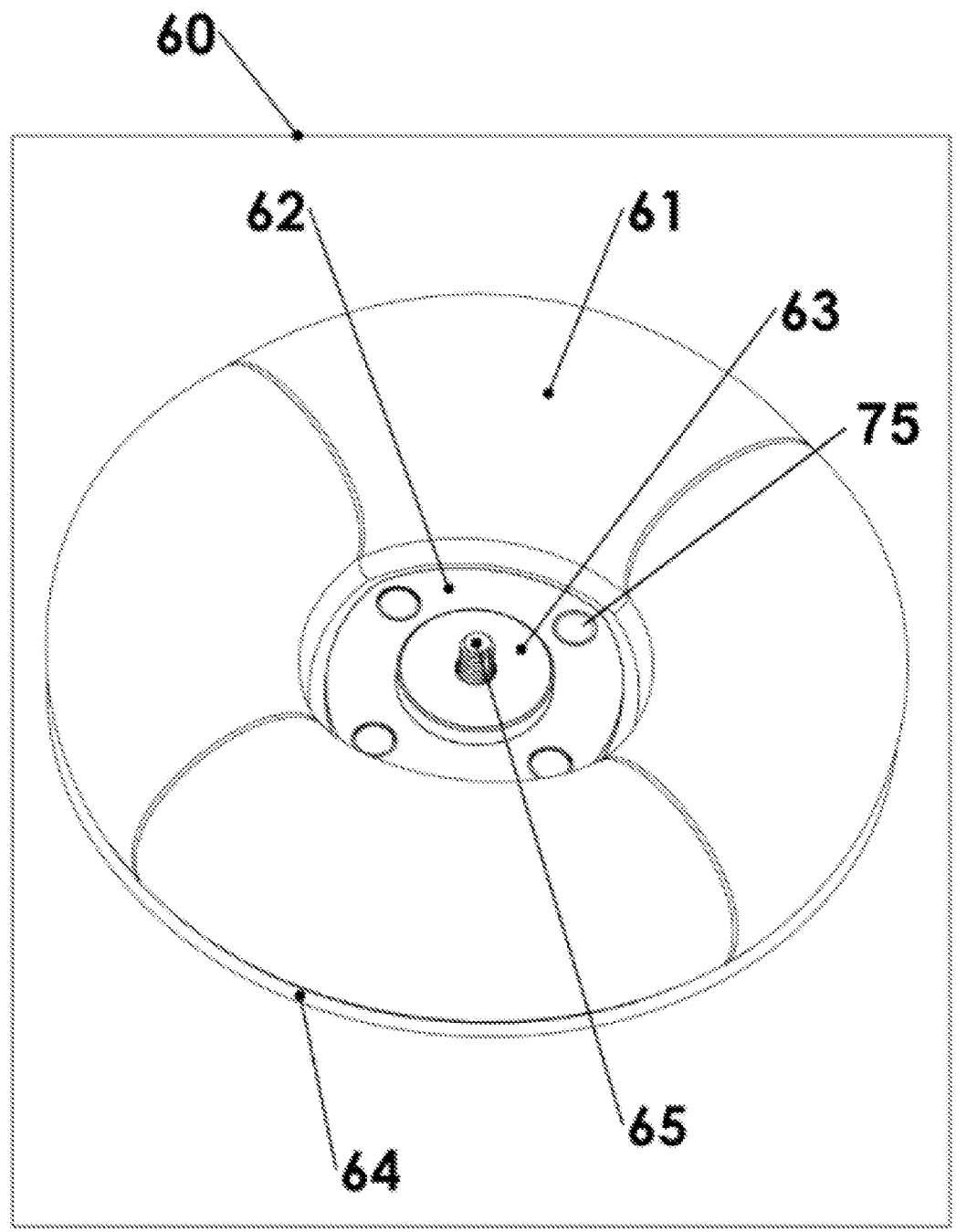
FIG. 3 shows a top perspective view of a camera supporting base.

FIG. 3 shows a top perspective view of a camera supporting base 60. As illustrated in FIG. 3, the camera supporting base includes an upper cover 61, a mounting platform 62 with a mounting surface 63, an attachment screw 65, and a lower cover 64. The mounting platform 62 is attached to the upper cover 61 using rivets 75.

It is noted that the mounting platform 62 includes a through hole (not shown) for the attachment screw 65.

It is noted that the upper cover 61 may be of flexible fabric.

It is noted that the upper cover 61 may incorporate a waterproofing treatment.

It is noted that the mounting platform 62 may be rigid.

Figure 4:
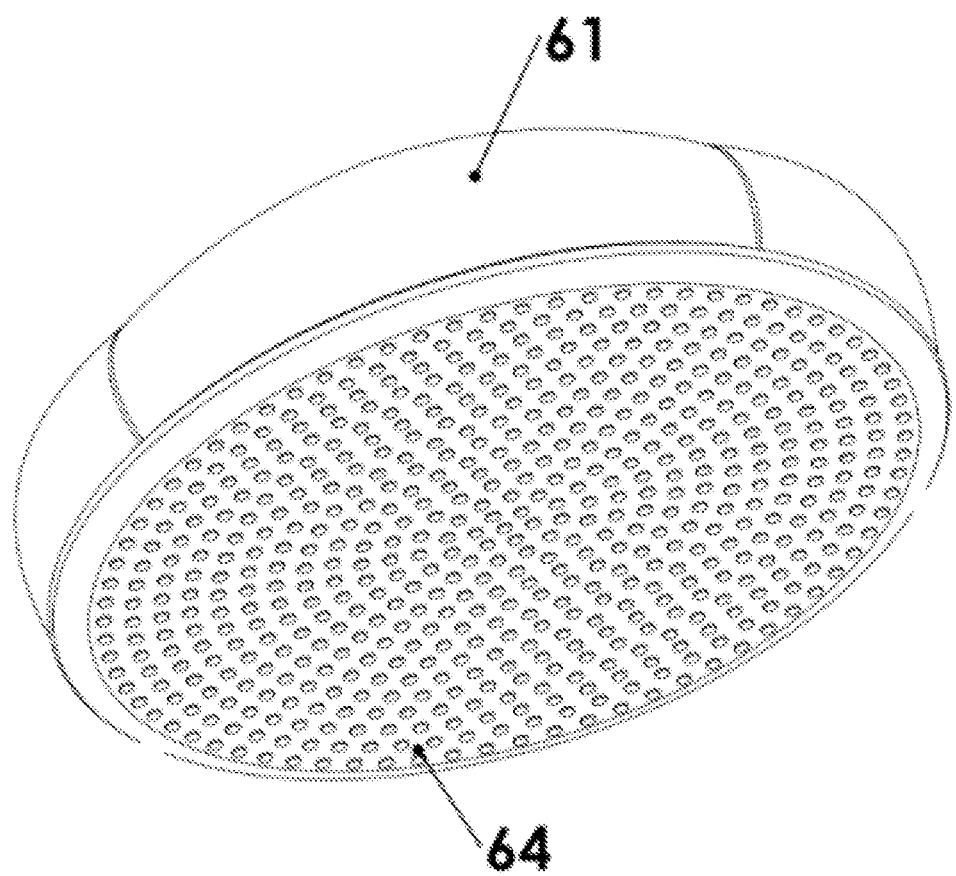
FIG. 4 shows a bottom perspective view of a camera supporting base.

FIG. 4 shows a bottom perspective view of the camera supporting base 60. It is noted that the lower cover 64 may be made of rubber textured to be resistant to skidding and slipping.

It is noted that the upper cover 61 and lower cover 64 may be sewn together.

Figure 5:
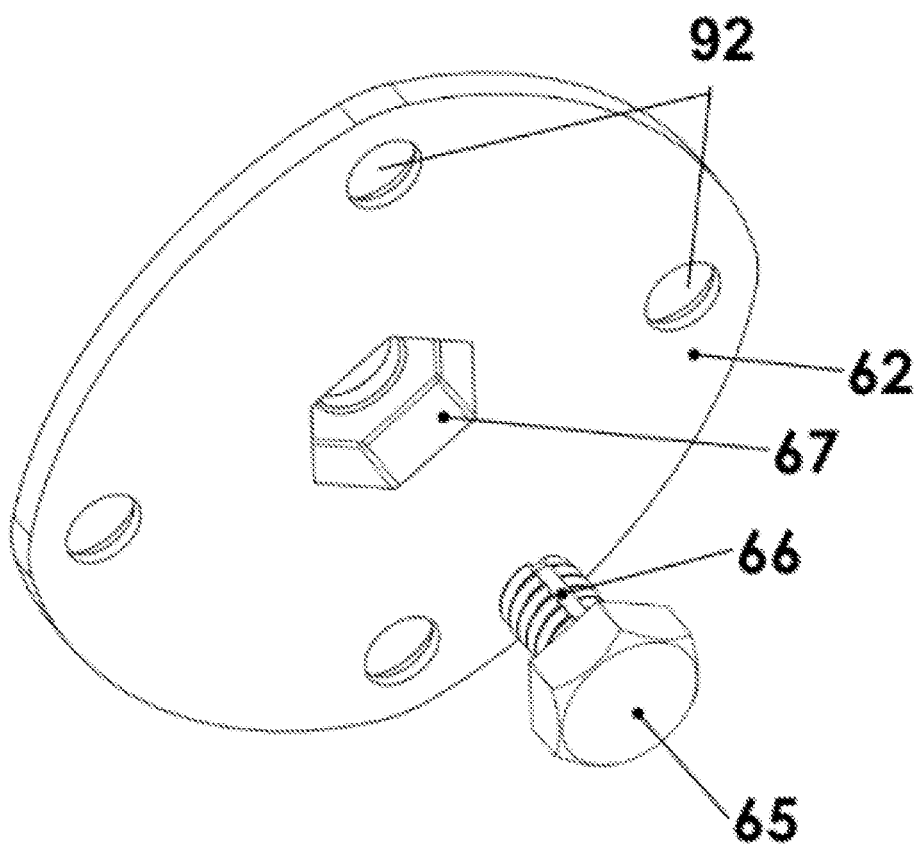
FIG. 5 shows a bottom perspective view of a central platform and attachment bolt for a camera supporting base.

FIG. 5 shows a bottom perspective view of the mounting platform 62 with the attachment screw 65.

To achieve leverage when mounting the ball head 10, the mounting platform 62 may incorporate a shaped recess 67 to retain the head of the attachment screw 65. The mounting platform 62 may incorporate through-holes 92 to support the riveting of the mounting platform 62 to the upper cover 61.

To prevent inadvertent loosening of the ball head 10, the attachment screw 65 may incorporate an elastic thread-locking element 66.

It is noted that the attachment screw 65 of FIG. 5 has a standard thread as found on conventional camera (videographic and photographic) support mounts, such as conventional ball heads or flat plates.

Figure 6:
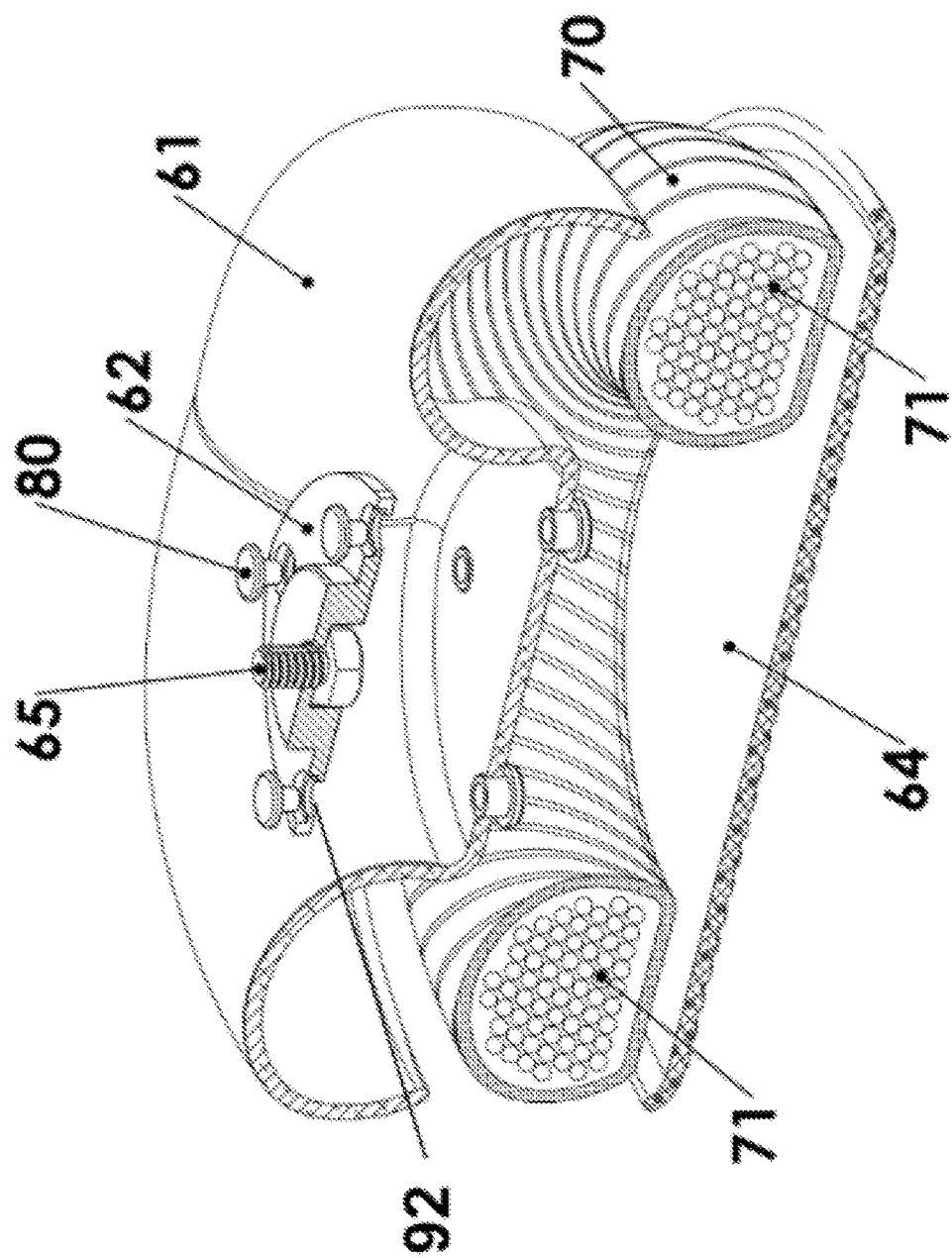
FIG. 6 illustrates an embodiment of a camera supporting base.

FIG. 6 illustrates an embodiment of the camera supporting base 60. In the embodiment, the space between the upper cover 61 and the lower cover 64 is occupied with a flexible tube 70 containing a stabilizing mass 71.

In the embodiment as illustrated in FIG. 6, the mounting platform 62 is retained to the upper cover 61 using rivets 80. The rivets 80 pass through the through-holes 92 of the mounting platform 62.

It is noted that the flexible tube 70 may be of rubber.

It is noted that the flexible tube 70 may be of plastic film.

It is noted that the flexible tube 70 may take the form of a continuous torus, or take the form of a bag with discrete sealed ends that abut each other.

It is noted that the stabilizing mass 71 may incorporate plastic beads, metal shot, gravel or mixtures of these and/or similar materials such that a desired weight is achieved.

It is noted that the stabilizing mass 71 may incorporate silicone, plasticine, sand or mixtures of these and/or similar materials such that a desired pliability is achieved.

It is noted that the stabilizing mass 71 may form a toroidal shape.

Figure 7:
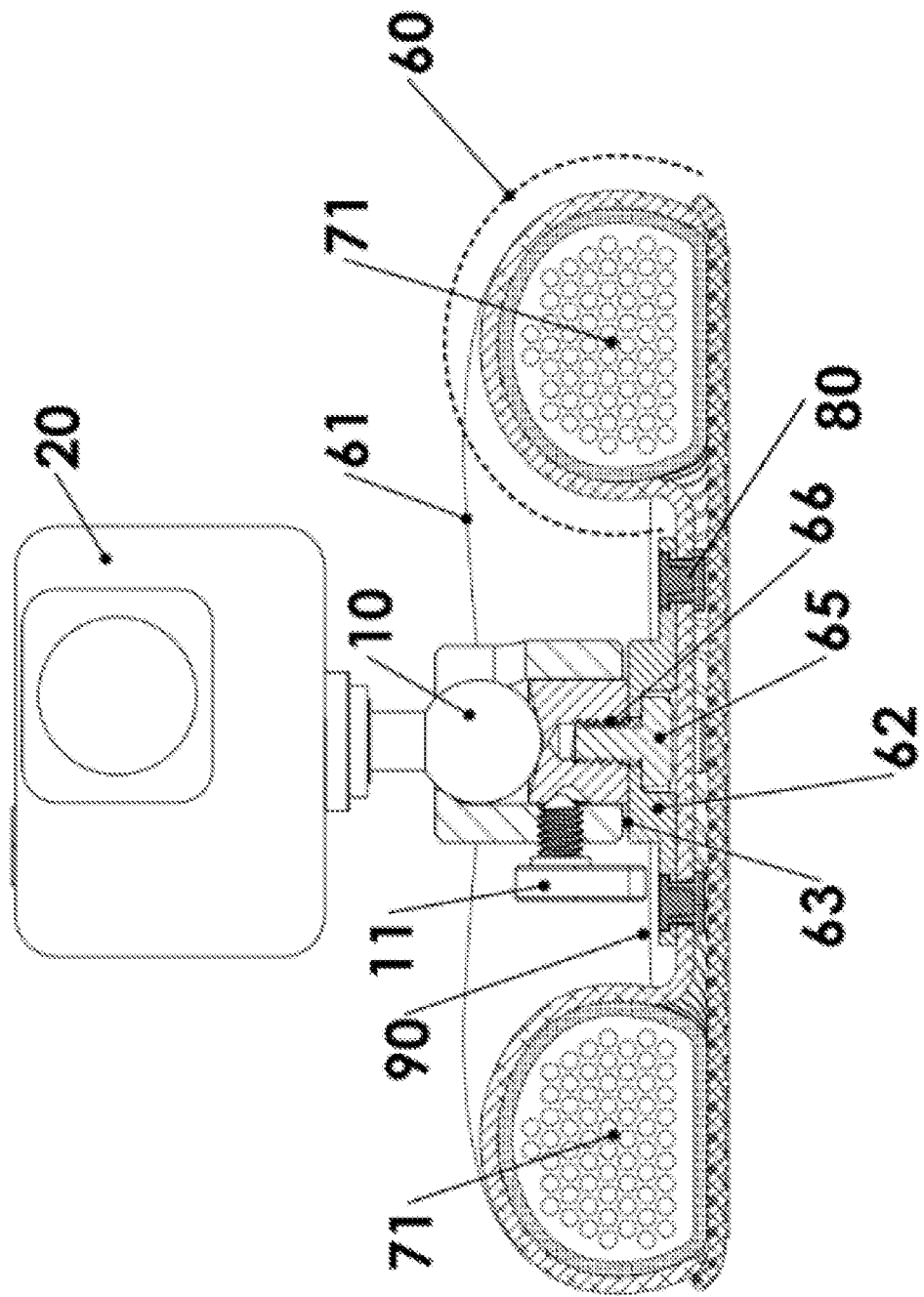
FIG. 7 illustrates the embodiment of the camera supporting base with the positionable ball head and the compact camera mounted.

FIG. 7 illustrates the embodiment from FIG. 6 with the positionable ball head 10 mounted via the attachment screw 65 and the compact camera 20 mounted to the positionable ball head 10.

As illustrated in FIG. 7, the stabilizing mass 71 is shaped such that it surrounds the mounting platform 62.

Furthermore, as illustrated in FIG. 7, the stabilizing mass 71 is shaped such that the mounting surface 63 of the mounting platform 62 is recessed below the highest contour of the upper cover 61.

As illustrated in FIG. 7, a recessed area 90 is formed between the mounting surface 63 and upper cover 61, allowing for room for the positioning clamp lever 11 to protrude below the mounting surface 63.

It is noted that maintaining a small diameter of the mounting surface 63 is advantageous regarding allowing for more choice regarding the size of the positionable ball head 10.

It is further noted that the non-coplanar nature of the surfaces of dual levels of the mounting platform allows for elements on the camera mounting device to be utilized without being impeded by the stabilizing mass 71.

As illustrated in FIG. 7, the mounting platform 62 is formed as a pedestal with two levels, with the mounting surface 63 being raised and non-coplanar with the lower surface (69 of FIG. 9) of the mounting platform 62, to allow for a large footprint for the rivets 80 without requiring a larger diameter of the mounting surface 63.

As an alternative embodiment, it is noted that the mounting platform 62 could share a common outside boundary with the mounting surface 63, with the rivets 80 located within the outside boundary of the mounting surface 63.

As a further alternative embodiment, it is noted that the mounting platform 62 could share a common outside boundary with the mounting surface 63, with attachment screws (FIG. 25) located within the outside boundary of the mounting surface 63.

Figure 8:
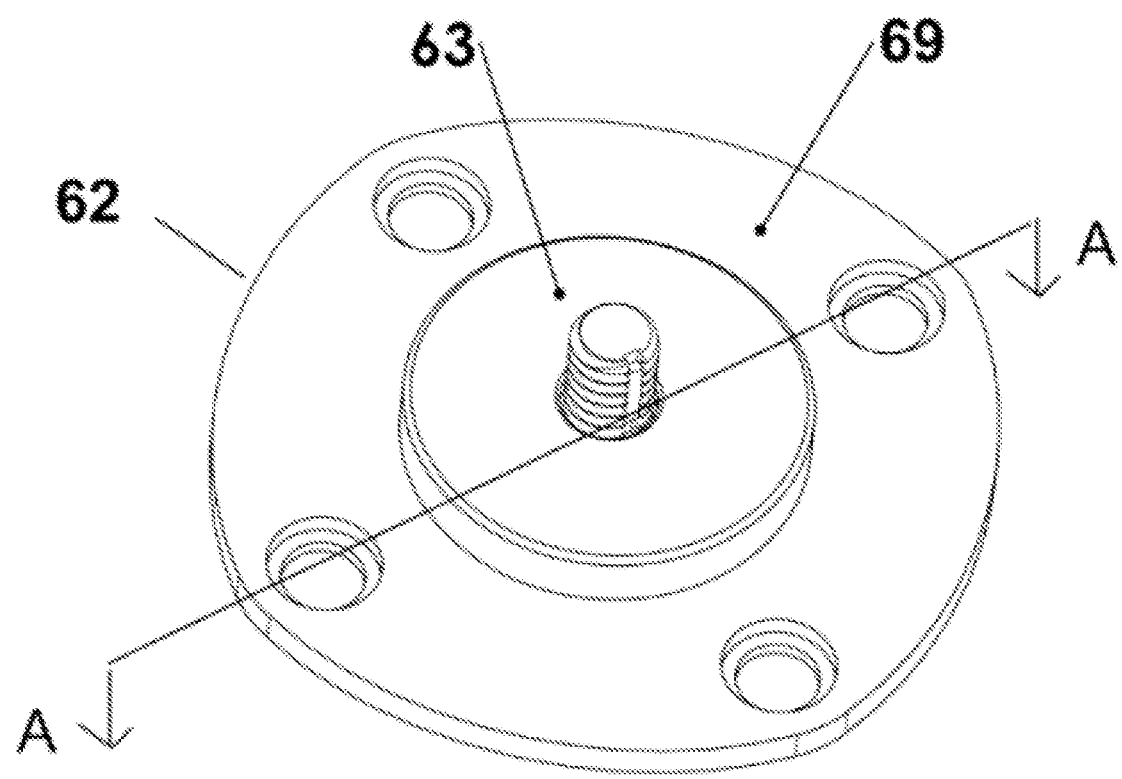
FIG. 8 shows a top perspective view of a central platform and attachment bolt for a camera supporting base.

FIG. 8 shows a top perspective view of the mounting platform 62 with the attachment screw.

To avoid impeding the use of elements on the camera mount, the mounting platform 62 is formed as a pedestal with two levels, with the mounting surface 63 being raised and non-coplanar with the lower surface 69 of the mounting platform 62.

Figure 9:
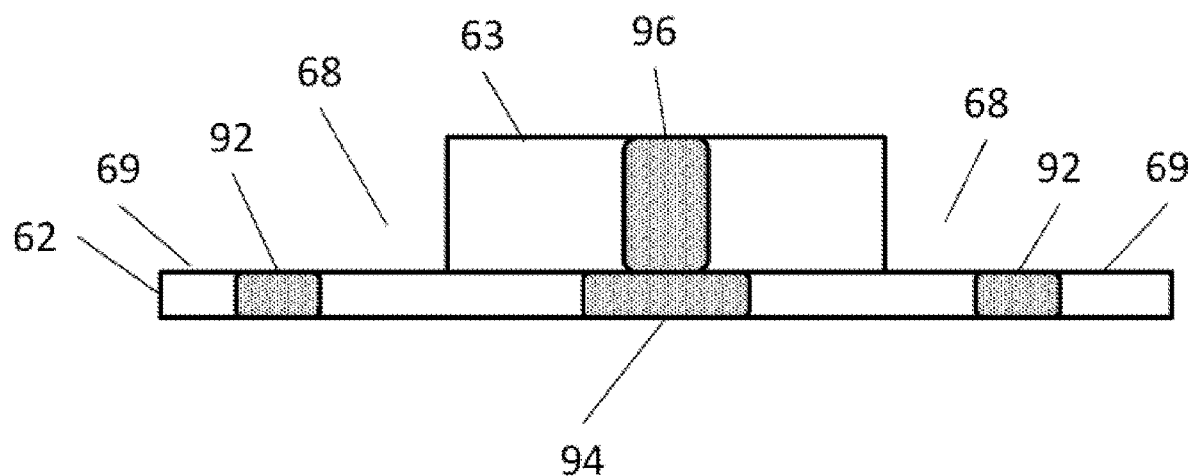
FIG. 9 shows a side perspective along the lines A-A of FIG. 8 of a central platform for the camera supporting base.

FIG. 9 shows a side perspective along the lines A-A of FIG. 8 of a central platform for the camera supporting base.

To avoid impeding the use of elements on the camera mount, the mounting platform 62 is formed as a pedestal with two levels and a recess area or volume 68. As illustrated in FIG. 9, a mounting level (surface) 63 of the mounting platform 62 is raised above a lower level (surface) 69 of the mounting platform 62.

In other words, the mounting level (surface) 63 of the mounting platform 62 is non-coplanar with the lower level (surface) 69 of the mounting platform 62.

The bi-level (bi-surface) configuration of the mounting platform 62 creates a step between the mounting level (surface) 63 of the mounting platform 62 and the lower level (surface) 69 of the mounting platform 62, thereby forming the recess area or volume 68, wherein elements on the camera mount can be used without impediment.

As illustrated in FIG. 9, the lower level (surface) 69 of the mounting platform 62 includes openings 92 for rivets (not shown). The lower level (surface) 69 of the mounting platform 62 also includes a recess 94 to retain the head of an attachment screw (not shown).

The pedestal of the mounting level (surface) 63 includes a recess 96 to retain an attachment screw (not shown).

Figure 10:
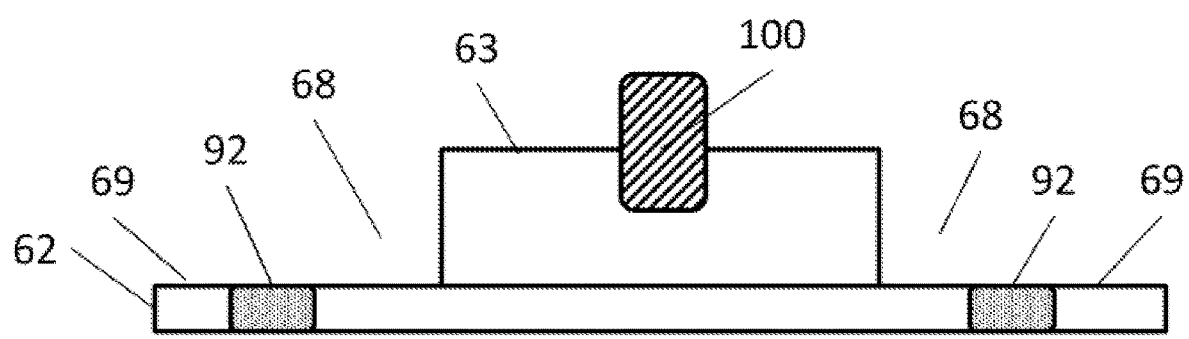
FIG. 10 shows a side perspective another of a central platform for the camera supporting base.

FIG. 10 shows a side perspective of another embodiment of a central platform for the camera supporting base.

To avoid impeding the use of elements on the camera mount, the mounting platform 62 is formed as a pedestal with two levels and a recess area or volume 68. As illustrated in FIG. 10, a mounting level (surface) 63 of the mounting platform 62 is raised above a lower level (surface) 69 of the mounting platform 62. In other words, the mounting level (surface) 63 of the mounting platform 62 is non-coplanar with the lower level (surface) 69 of the mounting platform 62.

The bi-level (bi-surface) configuration of the mounting platform 62 creates a step between the mounting level (surface) 63 of the mounting platform 62 and the lower level (surface) 69 of the mounting platform 62, thereby forming the recess area or volume 68, wherein elements on the camera mount can be used without impediment.

As illustrated in FIG. 10, the lower level (surface) 69 of the mounting platform 62 includes openings 92 for rivets (not shown). The pedestal of the mounting level (surface) 63 includes an embedded attachment screw 100 to provide an attachment mechanism for a camera.

Figure 11:
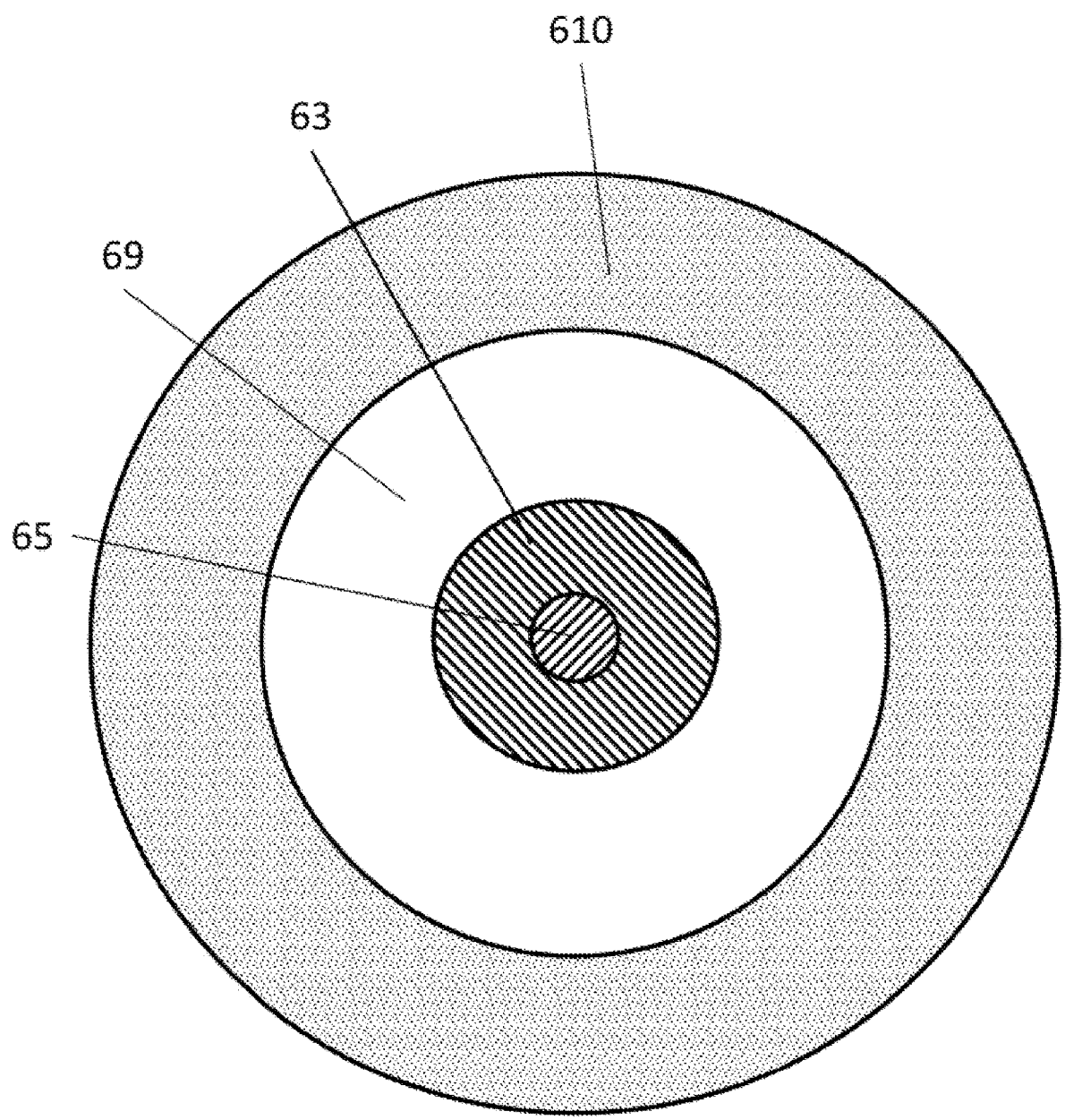
FIG. 11 shows a top perspective view of another embodiment of a camera supporting base.

FIG. 11 shows a top perspective view of a camera supporting base. As illustrated in FIG. 11, the camera supporting base includes a stabilizing material 610, a mounting platform with a mounting level (surface) 63, an attachment screw 65, and a lower level (surface) 69.

The lower level (surface) 69 provides the mechanism for operationally attaching the mounting platform 62 to the stabilizing material 610. The operational attachment allows the transference of a tipping force from the mounted camera to the stabilizing material, thereby preventing a tipping action.

Figure 12:
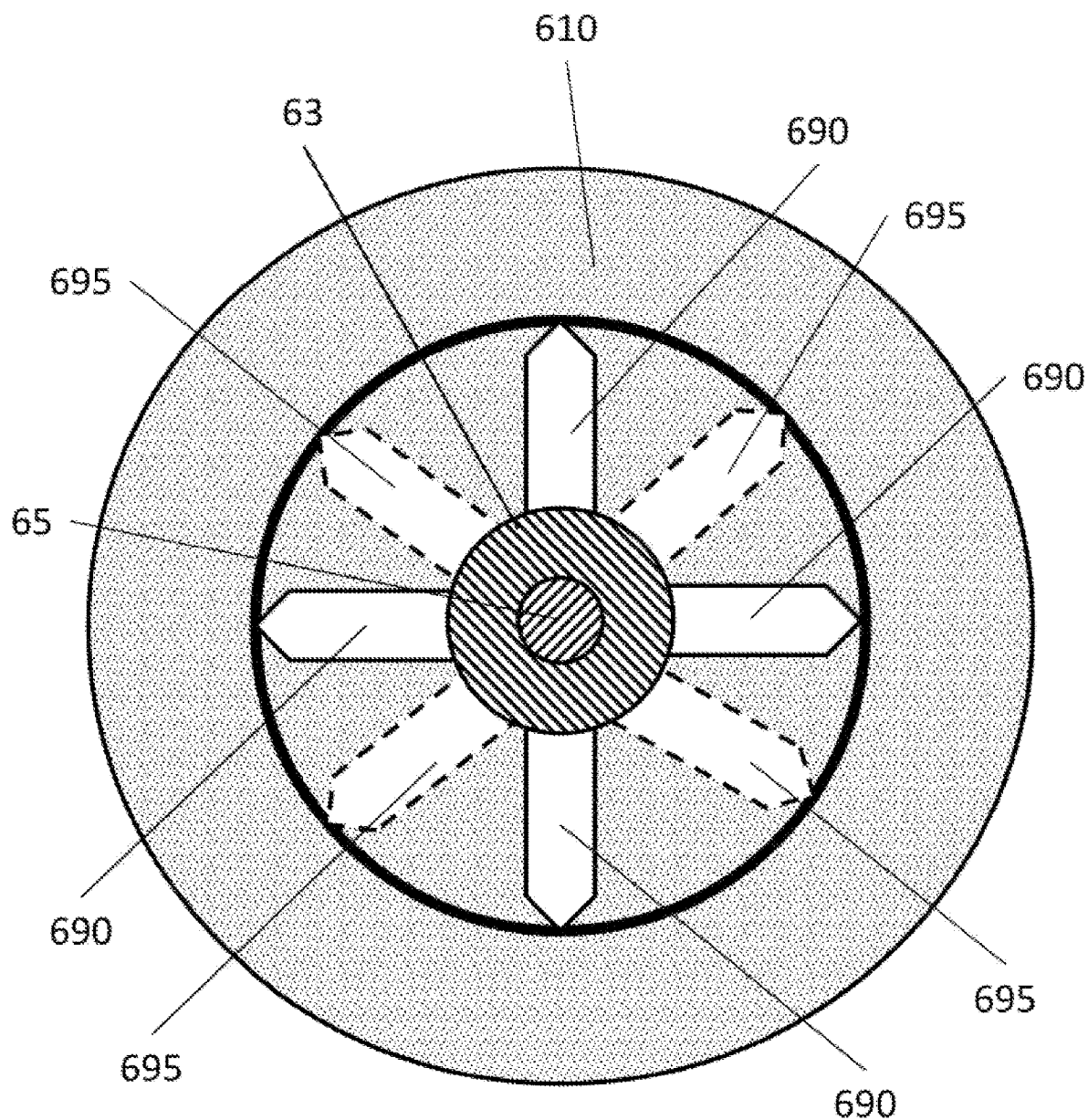
FIG. 12 shows a top perspective view of a further embodiment of a camera supporting base.

FIG. 12 shows a top perspective view of another embodiment of the camera supporting base. As illustrated in FIG. 12, the camera supporting base includes a stabilizing material 610, a mounting platform with a mounting level (surface) 63, an attachment screw 65, and multiple lower levels (surfaces) 690.

In other words, the lower level (surface) 69 of FIG. 11 is broken up into multiple lower levels (surfaces) 690, forming leg-like stability members radiating from the mounting level (surface) 63.

The multiple lower levels (surfaces) 690 provide the mechanisms for operationally attaching the mounting platform 62 to the stabilizing material 610. The operational attachment allows the transference of a tipping force from the mounted camera to the stabilizing material, thereby preventing a tipping action.

The lower level (surface) 69 of FIG. 12 may optionally be broken up into additional multiple lower levels (surfaces) 695, forming additional leg-like stability members radiating from the mounting level (surface) 63.

Figure 13:
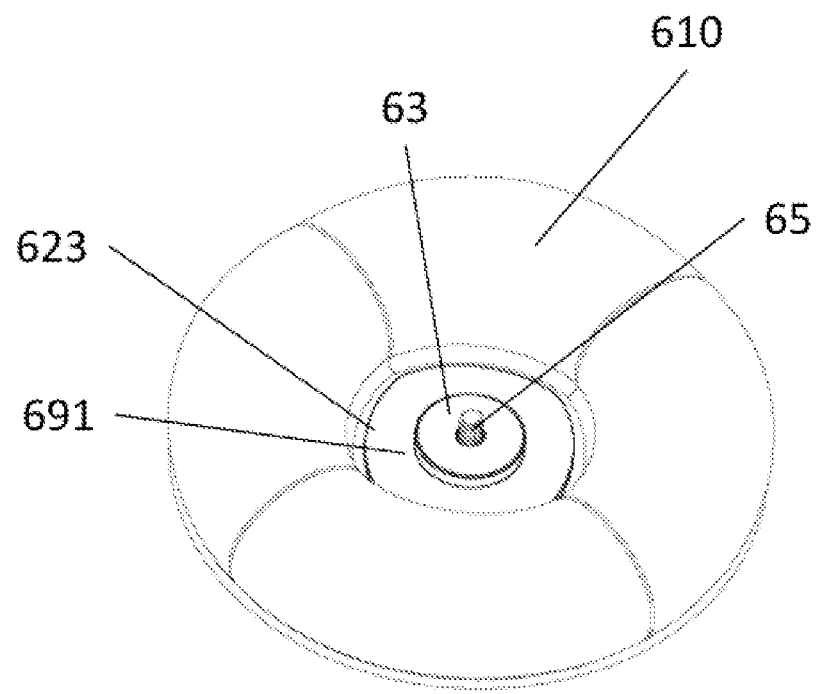
FIG. 13 shows a top perspective view of another embodiment of a camera supporting base.

FIG. 13 shows a top perspective view of another embodiment of a camera supporting base. As illustrated in FIG. 13, the camera supporting base includes an upper cover 610, a mounting platform 623 with a mounting surface (level) 63, an attachment screw 65, and a lower surface (level) 691.

With respect to FIG. 13, unlike the embodiment illustrated in FIGS. 3 and 5, the embodiment of FIG. 13 is not connected to the camera supporting base, via rivets, and thus, this embodiment does not include the rivet through-holes 92 of FIG. 5.

It is noted that the upper cover 610 may be of flexible fabric.

It is noted that the upper cover 610 may incorporate a waterproofing treatment.

It is noted that the mounting platform 623 may be rigid.

Figure 14:
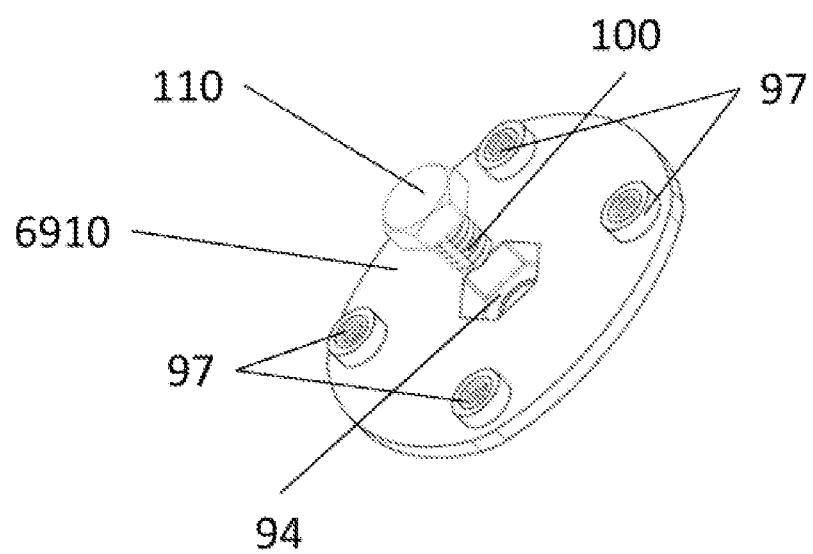
FIG. 14 shows a bottom perspective view of a central platform and attachment bolt for the camera supporting base of FIG. 13.

FIG. 14 shows a bottom perspective view of a central platform and attachment bolt for the camera supporting base of FIG. 13. As illustrated in FIG. 14, the bottom surface 6910 of the mounting platform includes threaded holes 97 to receive screws used to secure the mounting platform to the upper cover of the camera supporting base.

It is noted that the threaded holes 97 may be integral to the bottom surface 6910 of the mounting platform or the threaded holes 97 may be threaded inserts that are located in holes in the bottom surface 6910 of the mounting platform.

Moreover, it is noted that the threaded holes 97 can be eliminated by using self-tapping screws.

An attachment mechanism having a bolt head 110 and a threaded portion 100 is located in recess 94 such that a top portion of bolt head 110 is co-planar with the bottom surface 6910 when the attachment mechanism is seated in the recess 94.

It is noted that the top portion of bolt head 110 does not need to be co-planar with the bottom surface 6910 when the attachment mechanism is seated in the recess 94. Moreover, the bolt head 110 may be glued to the recess 94 or a support (spacer) may be provided under the bolt head 110 to prevent the bolt head 110 from falling out of the recess 94 and being allowed to spin freely under the mounting platform.

Figure 15:
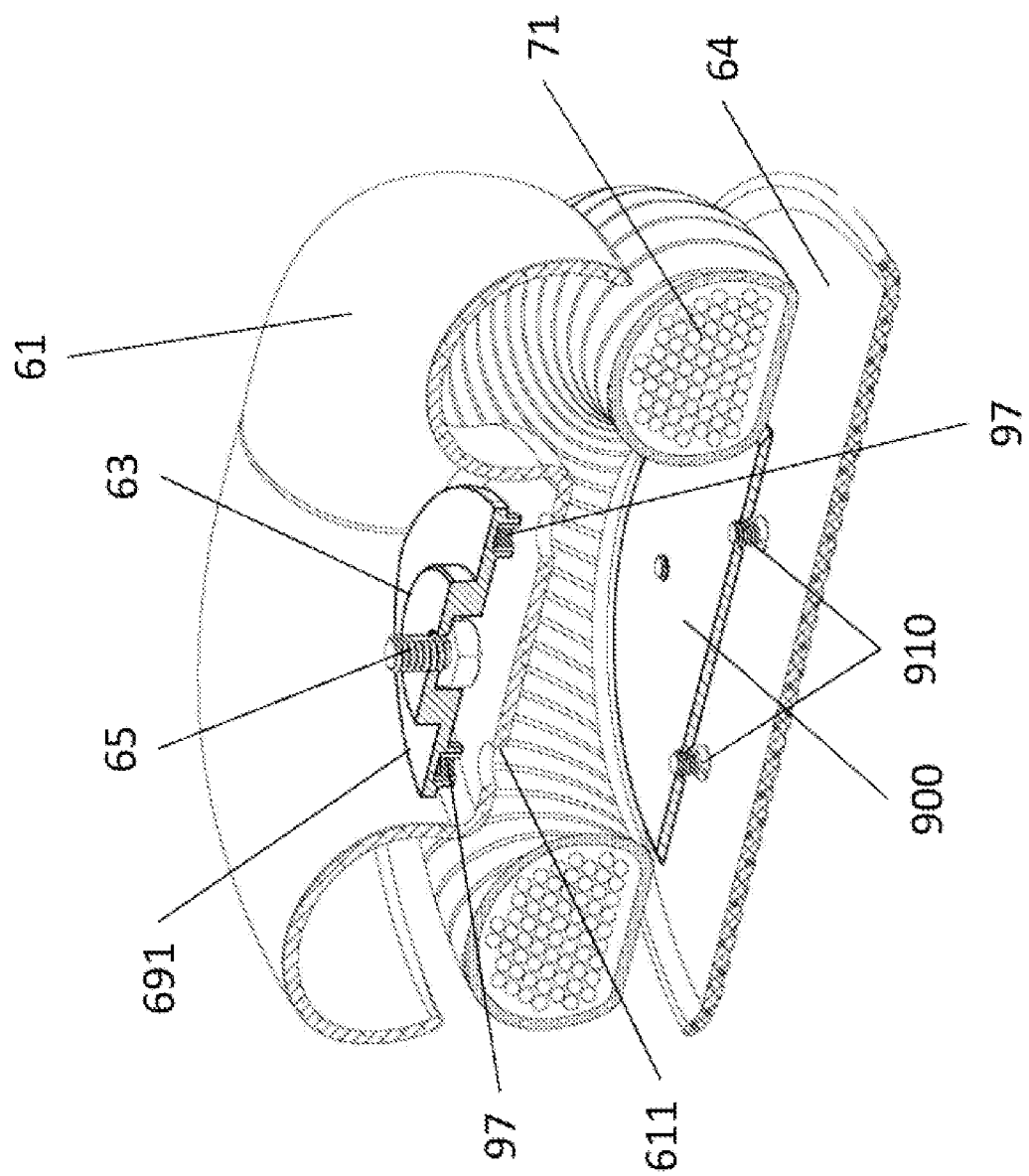
FIG. 15 shows a cut-away view of the camera supporting base of FIG. 13.

FIG. 15 shows a cut-away view of the camera supporting base of FIG. 13. As illustrated in FIG. 15, an attachment mechanism 65 is seated in the mounting platform having a mounting surface (level) 63 and a lower surface (level) 691. The mounting platform is secured to the upper cover 61 by screws 910 engaging the threaded holes 97 of the mounting platform through through-holes 611 in the upper cover 61.

As illustrated in FIG. 15, the mounting platform and a stabilizing mechanism 900 sandwich the upper cover 61. The stabilizing mechanism 900 is wedged under the stabilizing material 71.

The stabilizing mechanism 900 allows any tipping forces acting upon mounting platform to be translated to the stabilizing material 71 such that the weight of the stabilizing material 71 substantially prevents an actual tipping of the mounting platform and/or camera mounted thereon.

It is noted that the screws 910 may be recessed into the stabilizing mechanism 900.

The camera supporting base also includes a lower cover 64. It is noted that the lower cover 64 may be made of rubber textured to be resistant to skidding and slipping. It is also noted that the upper cover 61 and lower cover 64 may be sewn together.

Figure 16:
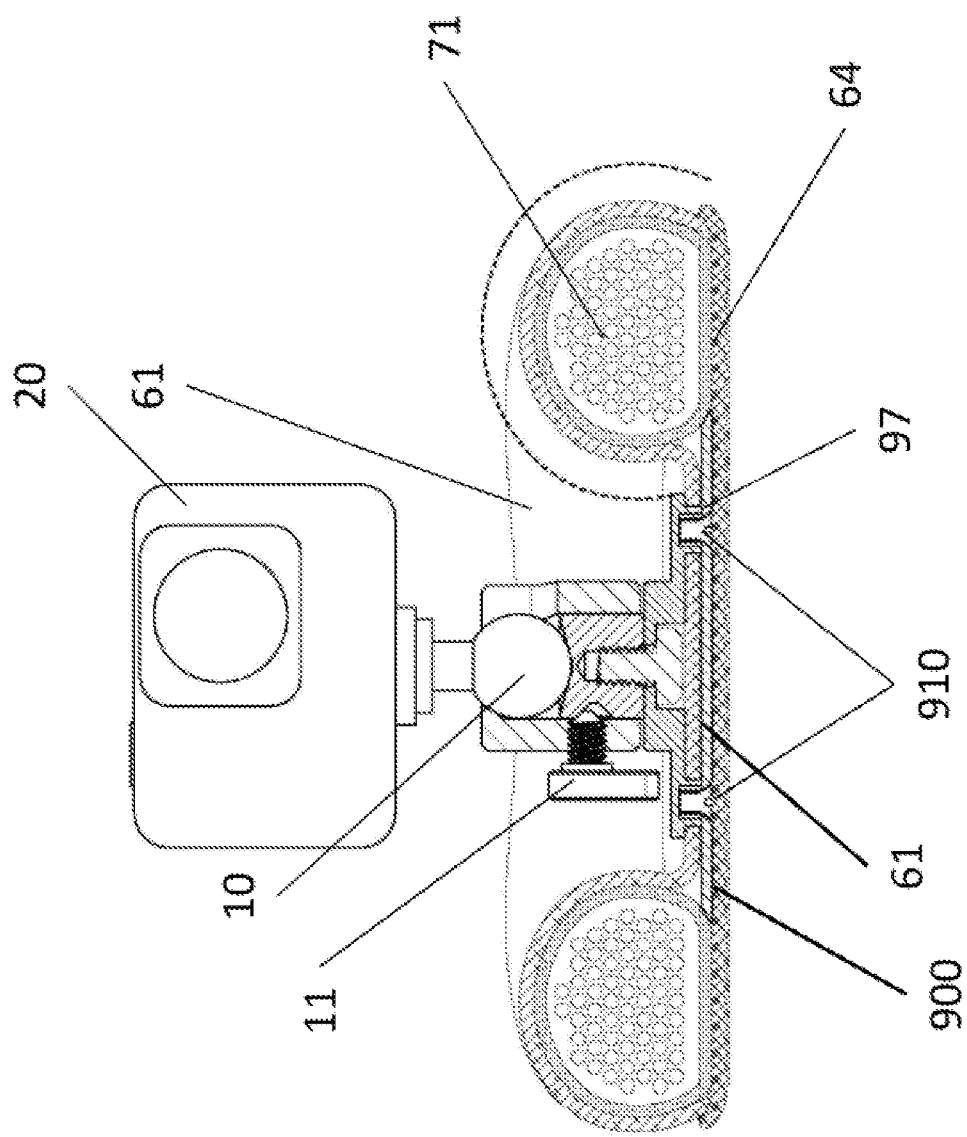
FIG. 16 shows another cut-away view of the camera supporting base of FIG. 13 with a camera mounted thereon.

FIG. 16 shows another cut-away view of the camera supporting base of FIG. 13 with a camera mounted thereon. As illustrated in FIG. 16, an attachment mechanism is seated in the mounting platform. The mounting platform is secured to the upper cover 61 by screws 910 engaging the threaded holes 97 of the mounting platform.

As illustrated in FIG. 16, the mounting platform and a stabilizing mechanism 900 sandwich the upper cover 61. The stabilizing mechanism 900 is wedged under the stabilizing material 71.

The stabilizing mechanism 900 allows any tipping forces acting upon mounting platform to be translated to the stabilizing material 71 such that the weight of the stabilizing material 71 substantially prevents an actual tipping of the camera mounted 20 thereon.

It is noted that the screws 910 may be recessed into the stabilizing mechanism 900.

The camera supporting base also includes a lower cover 64. It is noted that the lower cover 64 may be made of rubber textured to be resistant to skidding and slipping. It is also noted that the upper cover 61 and lower cover 64 may be sewn together.

It is noted, as illustrated in FIG. 16, a lever 11 for the camera mount is provided enough clearance for operation due to the bi-level nature of the mounting platform.

Figure 17:
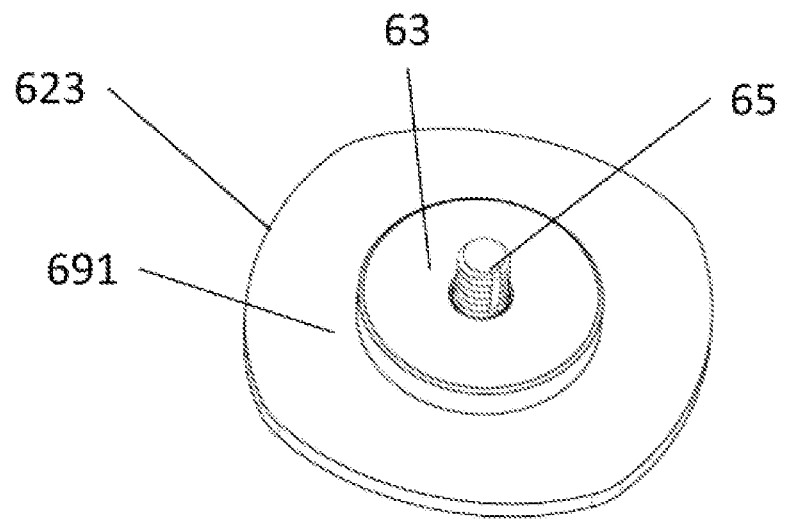
FIG. 17 shows a top perspective view of a central platform and attachment bolt for the camera supporting base of FIG. 13.

FIG. 17 shows a top perspective view of a central platform and attachment bolt for the camera supporting base of FIG. 13.

To avoid impeding the use of elements on the camera mount, the mounting platform 623 is formed as a pedestal with two levels, with the mounting surface (level) 63 being raised and non-coplanar with the lower surface (level) 691 of the mounting platform 623. It noted that in this embodiment, there are no through-holes for rivets.

Figure 18:
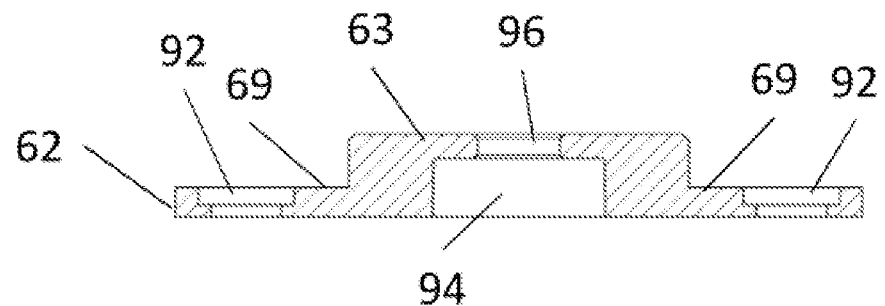
FIG. 18 shows a side perspective of a central platform for a camera supporting base.

FIG. 18 shows a side perspective of a central platform for a camera supporting base. To avoid impeding the use of elements on the camera mount, the mounting platform 62 is formed as a pedestal with two levels and a recess area or volume.

As illustrated in FIG. 18, a mounting level (surface) 63 of the mounting platform 62 is raised above a lower level (surface) 69 of the mounting platform 62. In other words, the mounting level (surface) 63 of the mounting platform 62 is non-coplanar with the lower level (surface) 69 of the mounting platform 62.

The bi-level (bi-surface) configuration of the mounting platform 62 creates a step between the mounting level (surface) 63 of the mounting platform 62 and the lower level (surface) 69 of the mounting platform 62, thereby forming the recess area or volume, wherein elements on the camera mount can be used without impediment.

As illustrated in FIG. 18, the lower level (surface) 69 of the mounting platform 62 includes openings 92 for rivets (not shown). The lower level (surface) 69 of the mounting platform 62 also includes a recess 94 to retain the head of an attachment screw (not shown) and a recess 96 to retain an attachment screw (not shown).

Figure 19:
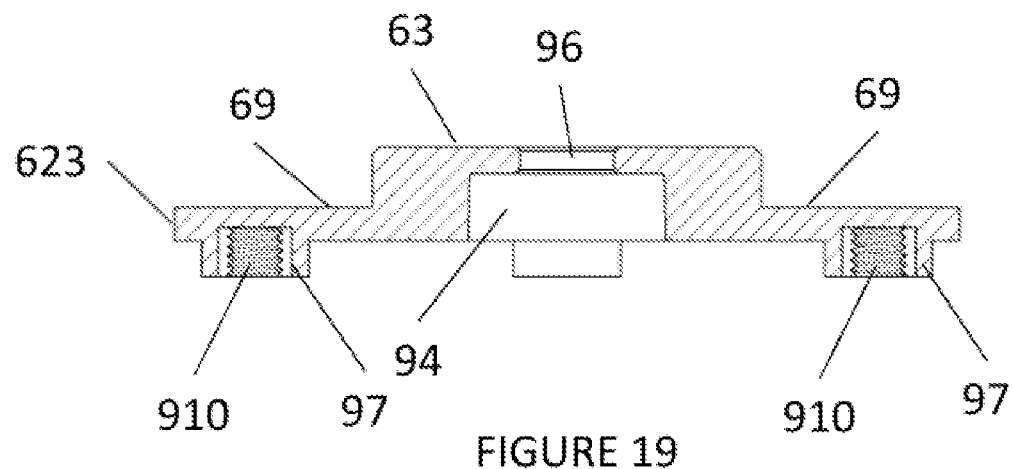
FIGS. 19 and 20 show side perspectives of different central platforms for the camera supporting base of FIG. 13.
Figure 20:
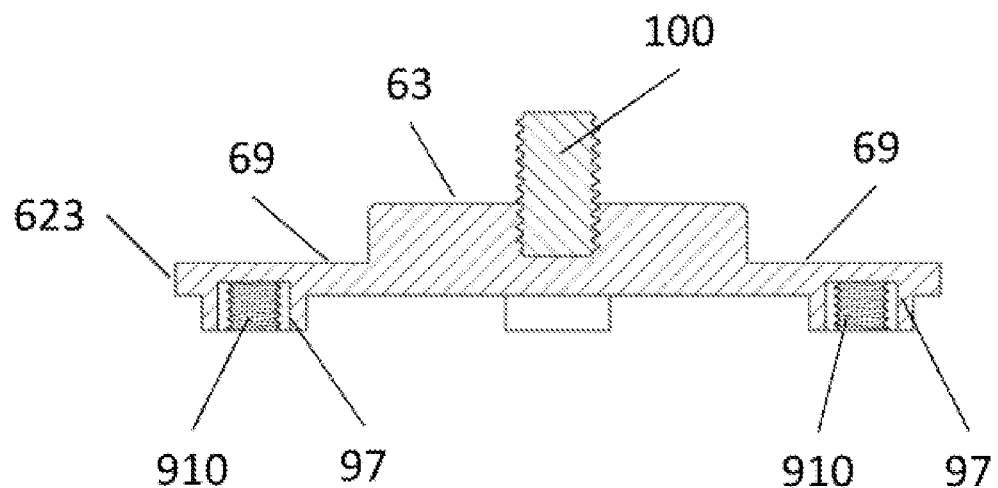

FIGS. 19 and 20 show side perspectives of different central platforms for the camera supporting base of FIG. 13. To avoid impeding the use of elements on the camera mount, the mounting platform 623 is formed as a pedestal with two levels and a recess area or volume.

As illustrated in FIG. 19, a mounting level (surface) 63 of the mounting platform 623 is raised above a lower level (surface) 69 of the mounting platform 623. In other words, the mounting level (surface) 63 of the mounting platform 623 is non-coplanar with the lower level (surface) 69 of the mounting platform 623.

The bi-level (bi-surface) configuration of the mounting platform 623 creates a step between the mounting level (surface) 63 of the mounting platform 623 and the lower level (surface) 69 of the mounting platform 623, thereby forming the recess area or volume, wherein elements on the camera mount can be used without impediment.

As illustrated in FIG. 19, the lower level (surface) 69 of the mounting platform 623 includes protruding threaded openings 97 for engaging screws 910. The lower level (surface) 69 of the mounting platform 623 also includes a recess 94 to retain the head of an attachment screw (not shown) and a recess 96 to retain an attachment screw (not shown).

As illustrated in FIG. 20, the lower level (surface) 69 of the mounting platform 623 includes protruding threaded openings 97 for engaging screws 910. The mounting level (surface) 63 of the mounting platform 623 includes an embedded attachment mechanism 100 to provide attachment to a camera mount (not shown).

Figure 21:
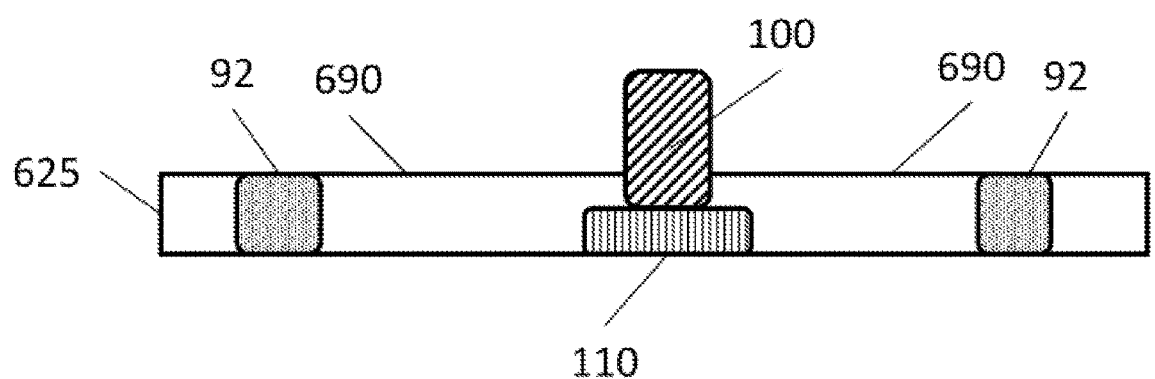
FIGS. 21 and 22 show side perspectives of different central platforms with an attachment mechanism for a camera supporting base.
Figure 22:
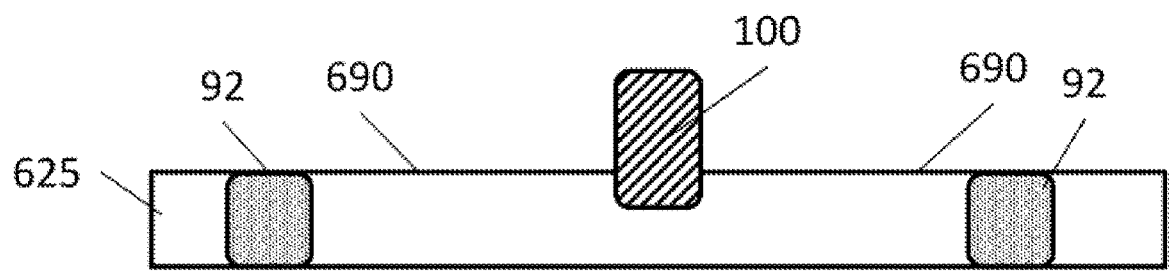

FIGS. 21 and 22 show side perspectives of different central platforms with an attachment mechanism for a camera supporting base.

As illustrated in FIG. 21, the mounting platform 625 is a single co-planar surface (level) 690. In other words, the mounting level (surface) of the mounting platform 625 is the lower level (surface) 690 of the mounting platform 625. The lower level (surface) 690 of the mounting platform 625 includes openings 92 for rivets (not shown). The lower level (surface) 690 of the mounting platform 625 also includes a head of an attachment screw 110 and an attachment screw 100.

As illustrated in FIG. 22, the mounting platform 625 is a single co-planar surface (level) 690. In other words, the mounting level (surface) of the mounting platform 625 is the lower level (surface) 690 of the mounting platform 625. The lower level (surface) 690 of the mounting platform 625 includes openings 92 for rivets (not shown). The lower level (surface) 690 of the mounting platform 625 also includes an embedded attachment screw 100.

Figure 23:
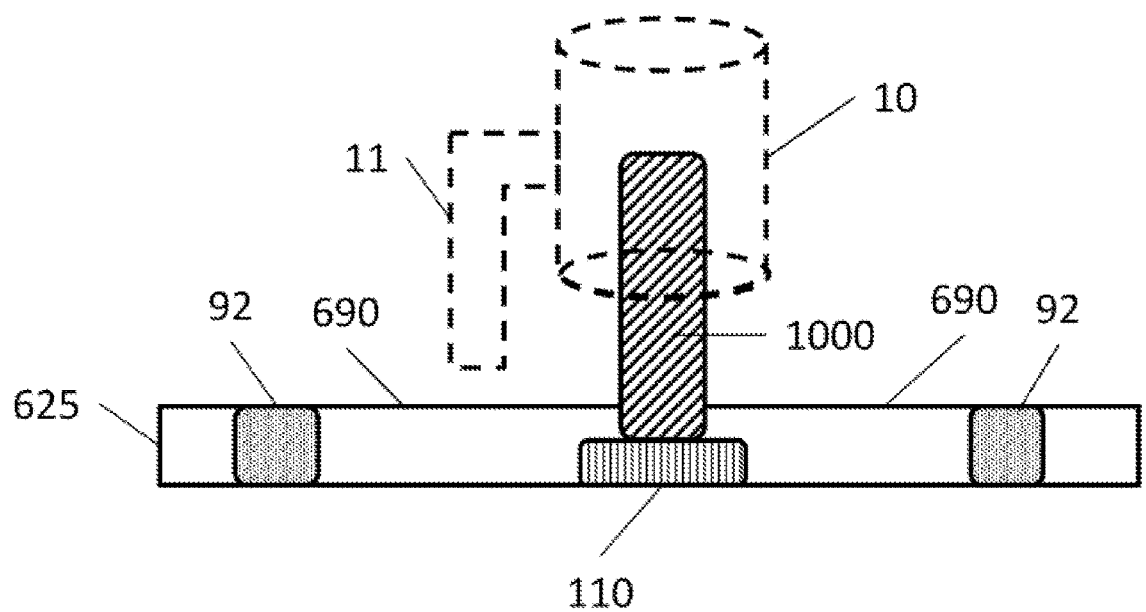
FIGS. 23 and 24 show side perspectives of different central platforms with an attachment mechanism for a camera supporting base.
Figure 24:
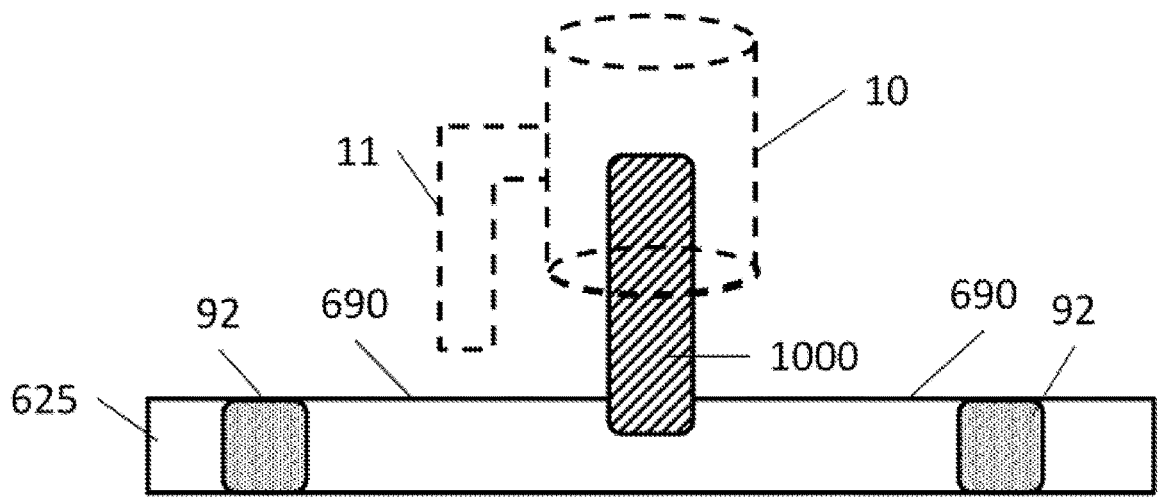

FIGS. 23 and 24 show side perspectives of different central platforms with an attachment mechanism for a camera supporting base.

As illustrated in FIG. 23, the mounting platform 625 is a single co-planar surface (level) 690. In other words, the mounting level (surface) of the mounting platform 625 is the lower level (surface) 690 of the mounting platform 625. The lower level (surface) 690 of the mounting platform 625 includes openings 92 for rivets (not shown). The lower level (surface) 690 of the mounting platform 625 also includes a head of an attachment screw 110 and an attachment screw 1000.

As further illustrated in FIG. 23, the attachment screw 100 has a dimensional length such that when a camera mount 10 is fully engaged with the attachment screw 1000, there is enough clearance from the bottom of the camera mount 10 to the top surface 690 of the mounting platform 625 to enable unimpeded operation of level 11 of the camera mount 10.

As illustrated in FIG. 24, the mounting platform 625 is a single co-planar surface (level) 690. In other words, the mounting level (surface) of the mounting platform 625 is the lower level (surface) 690 of the mounting platform 625. The lower level (surface) 690 of the mounting platform 625 includes openings 92 for rivets (not shown). The lower level (surface) 690 of the mounting platform 625 also includes an embedded attachment screw 1000.

As further illustrated in FIG. 24, the embedded attachment screw 1000 has a dimensional length such that when a camera mount 10 is fully engaged with the attachment screw 1000, there is enough clearance from the bottom of the camera mount 10 to the top surface 690 of the mounting platform 625 to enable unimpeded operation of level 11 of the camera mount 10.

Figure 25:
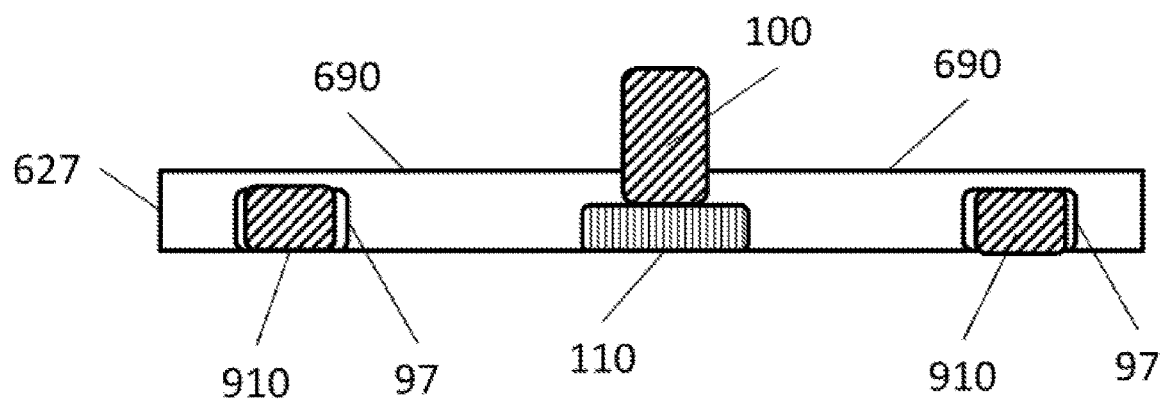
FIGS. 25 and 26 show side perspectives of different central platforms with an attachment mechanism for a camera supporting base.
Figure 26:
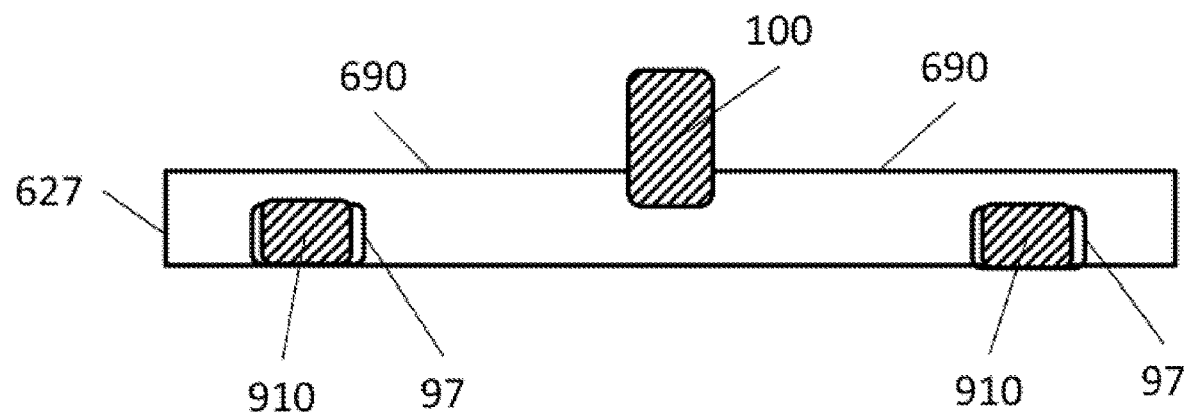

FIGS. 25 and 26 show side perspectives of different central platforms with an attachment mechanism for a camera supporting base.

As illustrated in FIG. 25, the mounting platform 627 is a single co-planar surface (level) 690. In other words, the mounting level (surface) of the mounting platform 627 is the lower level (surface) 690 of the mounting platform 627. The lower level (surface) 690 of the mounting platform 627 includes threaded openings 97 to engage screws 910.

As illustrated in FIG. 26, the mounting platform 627 is a single co-planar surface (level) 690. In other words, the mounting level (surface) of the mounting platform 627 is the lower level (surface) 690 of the mounting platform 627.

The lower level (surface) 690 of the mounting platform 627 includes threaded openings 97 to engage screws 910. The lower level (surface) 690 of the mounting platform 625 also includes an embedded attachment screw 1000.

Figure 27:
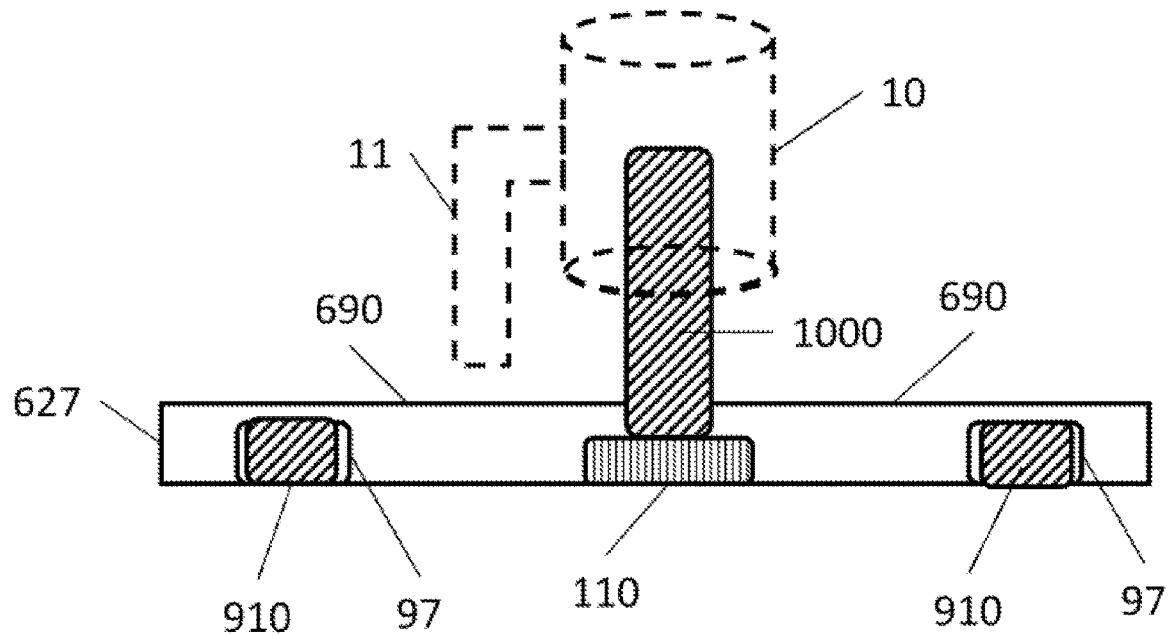
FIGS. 27 and 28 show side perspectives of different central platforms with an attachment mechanism for a camera supporting base.
Figure 28:
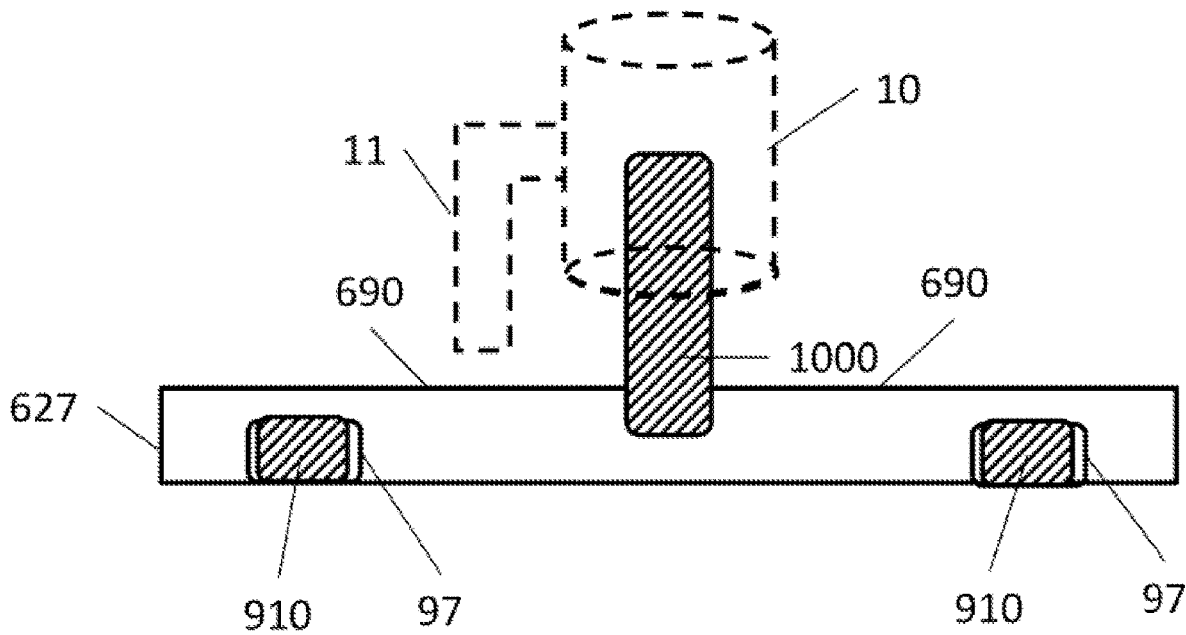

FIGS. 27 and 28 show side perspectives of different central platforms with an attachment mechanism for a camera supporting base.

As illustrated in FIG. 27, the mounting platform 627 is a single co-planar surface (level) 690. In other words, the mounting level (surface) of the mounting platform 627 is the lower level (surface) 690 of the mounting platform 627. The lower level (surface) 690 of the mounting platform 627 includes threaded openings 97 to engage screws 910.

As further illustrated in FIG. 27, the attachment screw 100 has a dimensional length such that when a camera mount 10 is fully engaged with the attachment screw 1000, there is enough clearance from the bottom of the camera mount 10 to the top surface 690 of the mounting platform 627 to enable unimpeded operation of level 11 of the camera mount 10.

As illustrated in FIG. 28, the mounting platform 627 is a single co-planar surface (level) 690. In other words, the mounting level (surface) of the mounting platform 627 is the lower level (surface) 690 of the mounting platform 627. The lower level (surface) 690 of the mounting platform 627 includes threaded openings 97 to engage screws 910. The lower level (surface) 690 of the mounting platform 625 also includes an embedded attachment screw 1000.

As further illustrated in FIG. 28, the attachment screw 100 has a dimensional length such that when a camera mount 10 is fully engaged with the attachment screw 1000, there is enough clearance from the bottom of the camera mount 10 to the top surface 690 of the mounting platform 627 to enable unimpeded operation of level 11 of the camera mount 10.

Figure 29:
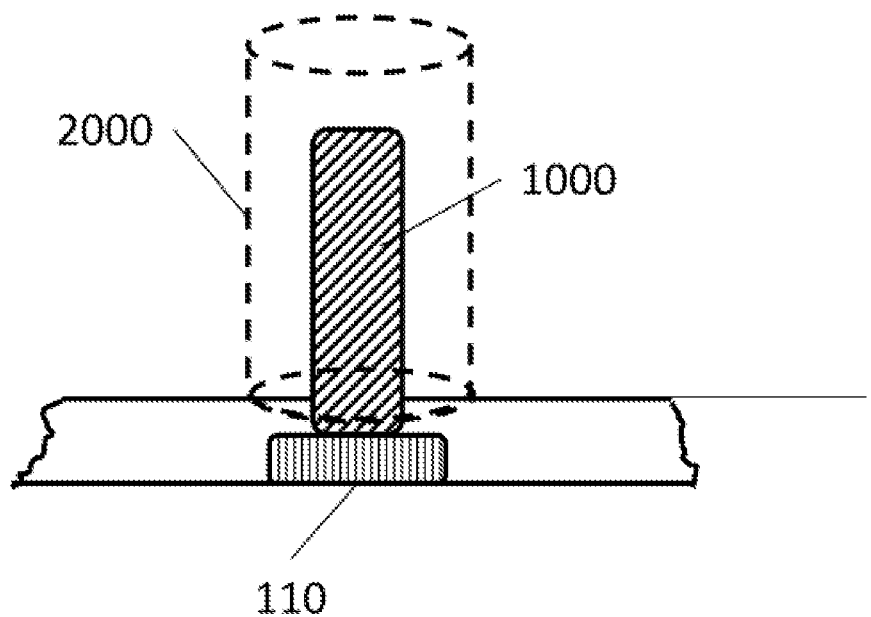
FIGS. 29 and 30 show side perspectives of different central platforms with a protective cover for the attachment mechanism for a camera supporting base.
Figure 30:
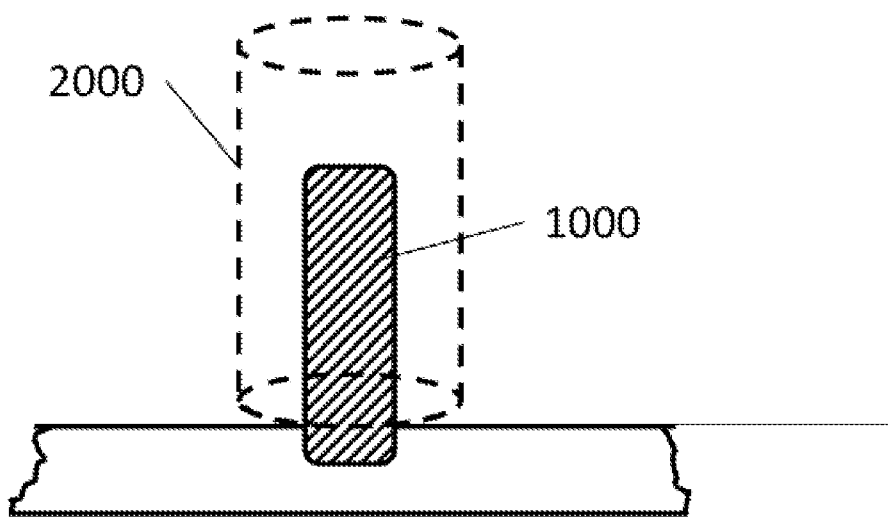

FIGS. 29 and 30 show side perspectives of different central platforms with a protective cover for the attachment mechanism for a camera supporting base.

As illustrated in FIGS. 29 and 30, a protective cap 2000 engages the attachment mechanism 1000 to provide protection to the attachment mechanism 1000 when the attachment mechanism 1000 is not in use. The protective cap 2000 may be tethered to the camera supporting base (not shown).

Figure 31:
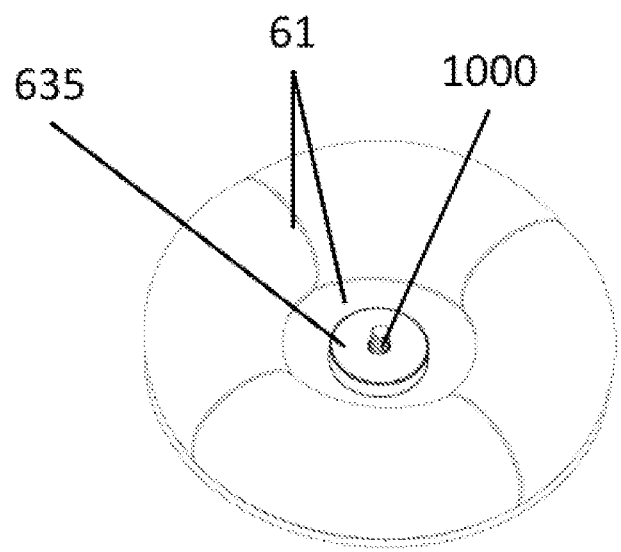
FIG. 31 shows a top perspective view of another embodiment of a camera supporting base.

FIG. 31 shows a top perspective view of another embodiment of a camera supporting base.

As illustrated in FIG. 31, the camera supporting base includes an upper cover 61, a mounting platform having a mounting surface (level) 635, and an attachment screw 1000.

With respect to FIG. 31, the mounting surface level 635 is part of a single level mounting platform having a dimensional height such that when a camera mount is fully engaged with the attachment screw 1000, there is enough clearance from the bottom of the camera mount to the upper cover 61 to enable unimpeded operation of a lever of the camera mount.

It is noted that throughout the description, the attachment screw or attachment mechanism may be a cylinder shaped member having a threaded outer surface for enabling a camera mount to attach thereto.

It is noted that the upper cover 61 may be of flexible fabric.

It is noted that the upper cover 61 may incorporate a waterproofing treatment.

Figure 32:
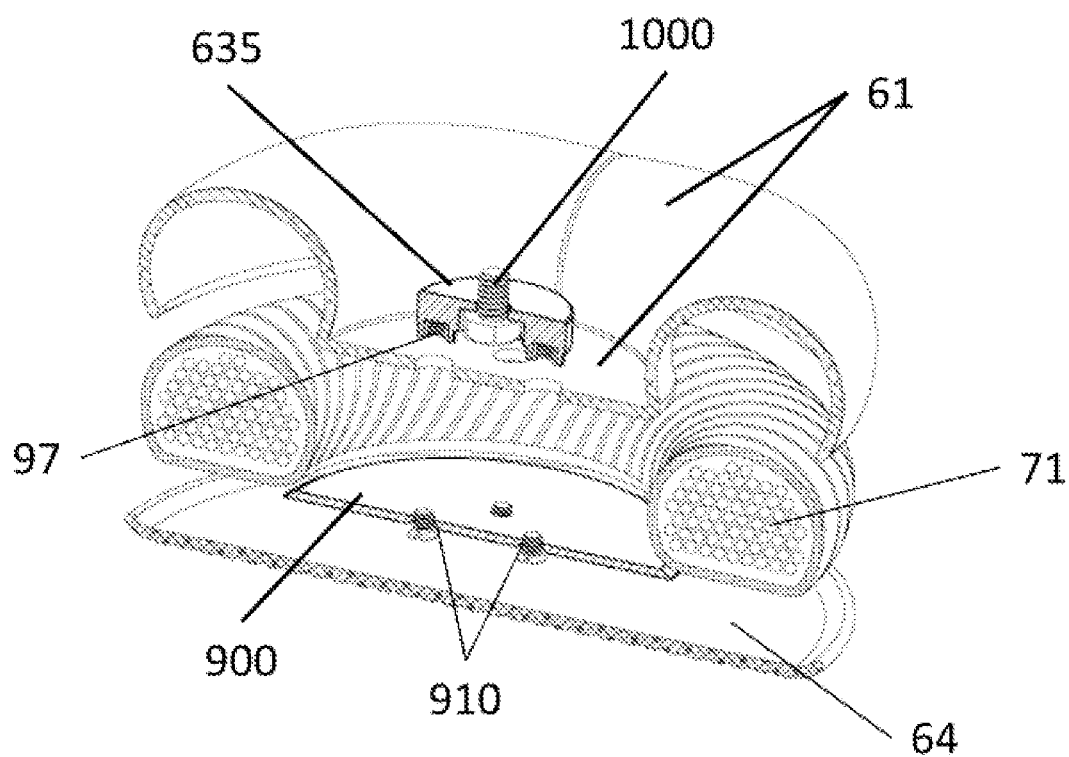
FIG. 32 shows a cut-away view of the camera supporting base of FIG. 31.

FIG. 32 shows a cut-away view of the camera supporting base of FIG. 31. As illustrated in FIG. 32, an attachment mechanism 1000 is seated in the mounting platform having a mounting surface (level) 635.

The mounting platform is secured to the upper cover 61 by screws 910 engaging the threaded holes 97 of the mounting platform through through-holes in the upper cover 61.

As illustrated in FIG. 32, the mounting platform and a stabilizing mechanism (plate) 900 sandwich the upper cover 61. The stabilizing mechanism 900 may be wedged under or may directly abut the stabilizing material 71. The stabilizing mechanism 900 allows any tipping forces acting upon mounting platform to be translated to the stabilizing material 71 such that the weight of the stabilizing material 71 substantially prevents an actual tipping of the mounting platform and/or camera mounted thereon.

It is noted that the screws 910 may be recessed into the stabilizing mechanism 900.

The camera supporting base also includes a lower cover 64. It is noted that the lower cover 64 may be made of rubber textured to be resistant to skidding and slipping. It is also noted that the upper cover 61 and lower cover 64 may be sewn together.

Figure 33:
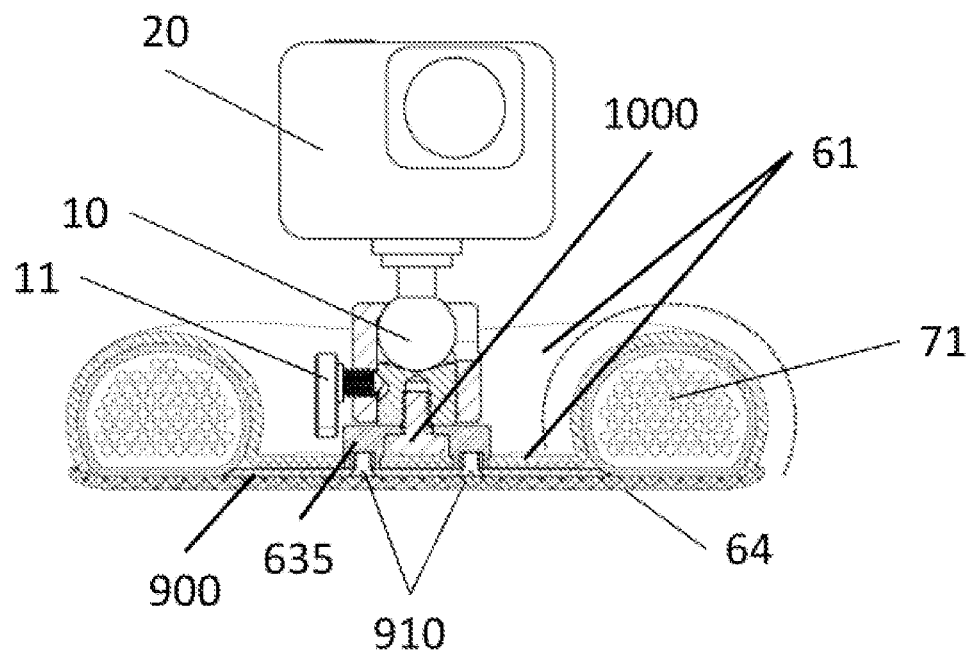
FIG. 33 shows another cut-away view of the camera supporting base of FIG. 31 with a camera mounted thereon.

FIG. 33 shows another cut-away view of the camera supporting base of FIG. 31 with a camera mounted thereon. As illustrated in FIG. 33, an attachment mechanism 1000 is seated in the mounting platform.

The mounting platform is secured to the upper cover 61 by screws 910 engaging the threaded holes 97 of the mounting platform.

As illustrated in FIG. 33, the mounting platform and a stabilizing mechanism (plate) 900 sandwich the upper cover 61. The stabilizing mechanism 900 may be wedged under or may directly abut the stabilizing material 71.

The stabilizing mechanism 900 allows any tipping forces acting upon mounting platform to be translated to the stabilizing material 71 such that the weight of the stabilizing material 71 substantially prevents an actual tipping of the camera mounted 20 thereon.

It is noted that the screws 910 may be recessed into the stabilizing mechanism 900.

The camera supporting base also includes a lower cover 64. It is noted that the lower cover 64 may be made of rubber textured to be resistant to skidding and slipping. It is also noted that the upper cover 61 and lower cover 64 may be sewn together.

It is noted, as illustrated in FIG. 33, a lever 11 for the camera mount is provided enough clearance for operation due to the height of the mounting platform.

Figure 34:
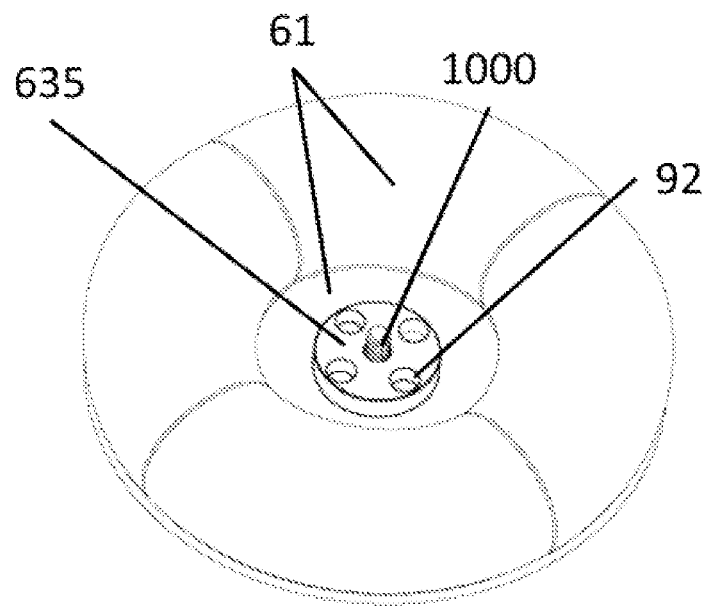
FIG. 34 shows a top perspective view of another embodiment of a camera supporting base.

FIG. 34 shows a top perspective view of another embodiment of a camera supporting base.

As illustrated in FIG. 34, the camera supporting base includes an upper cover 61, a mounting platform having a mounting surface (level) 635, an attachment screw 1000, and through holes 92 to allow rivets to attach the upper cover 61 to the mounting platform.

With respect to FIG. 34, the mounting surface level 635 is part of a single level mounting platform having a dimensional height such that when a camera mount is fully engaged with the attachment screw 1000, there is enough clearance from the bottom of the camera mount to the upper cover 61 to enable unimpeded operation of a lever of the camera mount.

It is noted that throughout the description, the attachment screw or attachment mechanism may be a cylinder shaped member having a threaded outer surface for enabling a camera mount to attach thereto.

It is noted that the upper cover 61 may be of flexible fabric.

It is noted that the upper cover 61 may incorporate a waterproofing treatment.

Figure 35:
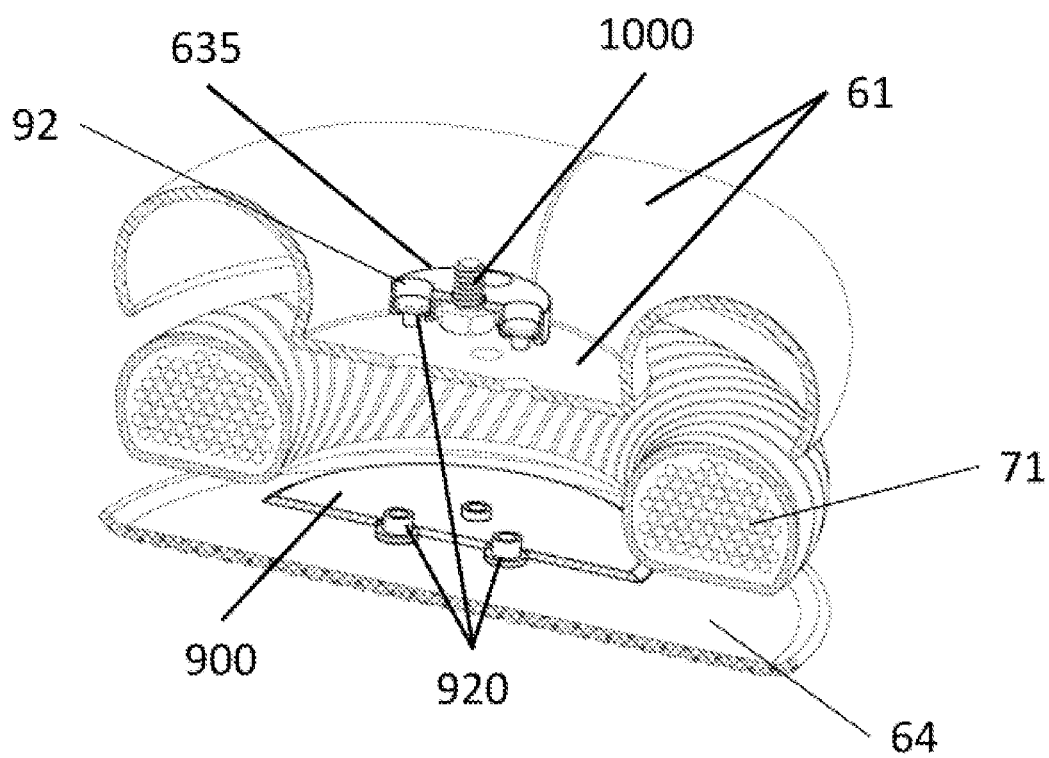
FIG. 35 shows a cut-away view of the camera supporting base of FIG. 34.

FIG. 35 shows a cut-away view of the camera supporting base of FIG. 34. As illustrated in FIG. 35, an attachment mechanism 1000 is seated in the mounting platform having a mounting surface (level) 635.

The mounting platform is secured to the upper cover 61 by rivets 920 engaging the recessed holes 92 on the mounting platform and via through-holes in the upper cover 61.

As illustrated in FIG. 35, the mounting platform and a stabilizing mechanism 900 sandwich the upper cover 61. The stabilizing mechanism 900 may be wedged under or may directly abut the stabilizing material 71.

The stabilizing mechanism 900 allows any tipping forces acting upon mounting platform to be translated to the stabilizing material 71 such that the weight of the stabilizing material 71 substantially prevents an actual tipping of the mounting platform and/or camera mounted thereon.

It is noted that the rivets 920 may be recessed into the stabilizing mechanism 900.

The camera supporting base also includes a lower cover 64. It is noted that the lower cover 64 may be made of rubber textured to be resistant to skidding and slipping. It is also noted that the upper cover 61 and lower cover 64 may be sewn together.

Figure 36:
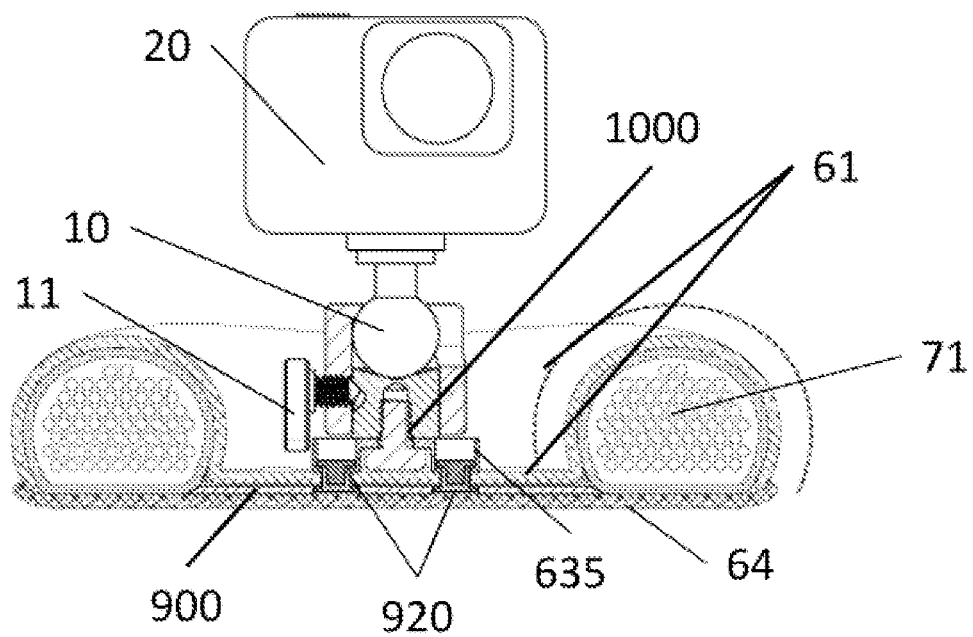
FIG. 36 shows another cut-away view of the camera supporting base of FIG. 34 with a camera mounted thereon.

FIG. 36 shows another cut-away view of the camera supporting base of FIG. 34 with a camera mounted thereon. As illustrated in FIG. 36, an attachment mechanism 1000 is seated in the mounting platform. The mounting platform is secured to the upper cover 61 by rivets 920 engaging the recessed holes 92 of the mounting platform.

As illustrated in FIG. 36, the mounting platform and a stabilizing mechanism 900 sandwich the upper cover 61. The stabilizing mechanism 900 may be wedged under or may directly abut the stabilizing material 71.

The stabilizing mechanism 900 allows any tipping forces acting upon mounting platform to be translated to the stabilizing material 71 such that the weight of the stabilizing material 71 substantially prevents an actual tipping of the camera mounted 20 thereon.

It is noted that the rivets 920 may be recessed into the stabilizing mechanism 900.

The camera supporting base also includes a lower cover 64. It is noted that the lower cover 64 may be made of rubber textured to be resistant to skidding and slipping. It is also noted that the upper cover 61 and lower cover 64 may be sewn together.

It is noted, as illustrated in FIG. 36, a lever 11 for the camera mount is provided enough clearance for operation due to the height of the mounting platform.

Figure 37:
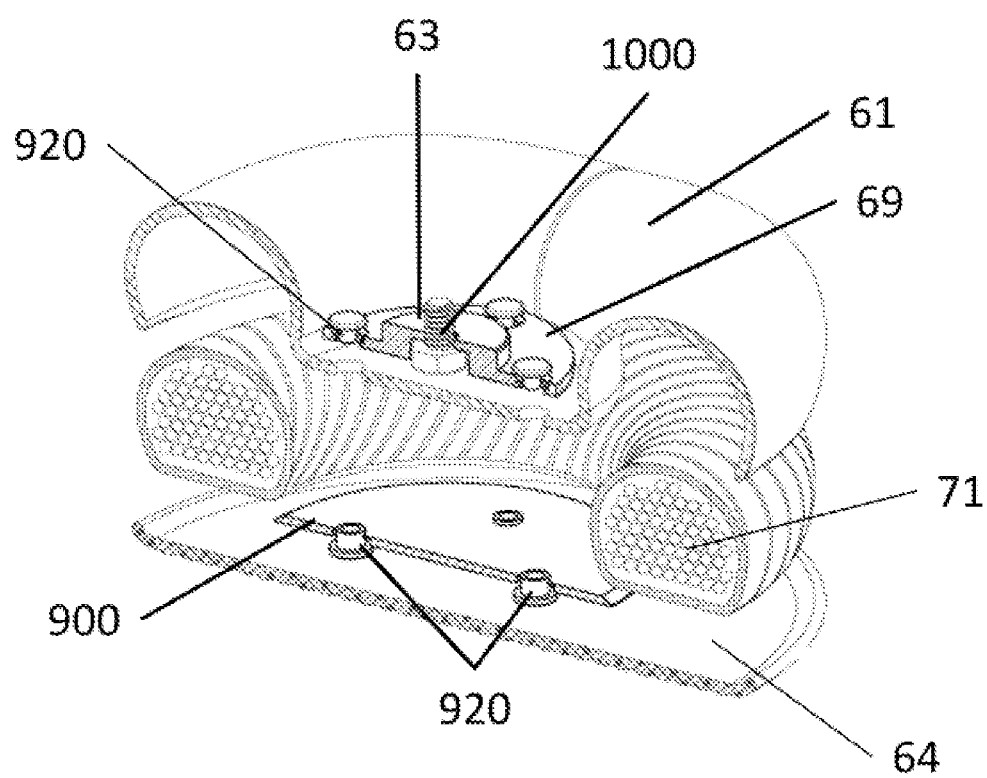
FIG. 37 shows a cut-away view of another embodiment of a camera supporting base.

FIG. 37 shows a cut-away view of another embodiment of a camera supporting base. As illustrated in FIG. 37, an attachment mechanism 1000 is seated in the mounting platform having a mounting surface (level) 63 and a lower surface (level) 69.

The mounting platform is secured to the upper cover 61 by rivets 920 engaging the recessed holes 92 of the mounting platform via through-holes in the upper cover 61.

As illustrated in FIG. 37, the mounting platform and a stabilizing mechanism 900 sandwich the upper cover 61. The stabilizing mechanism 900 may be wedged under or may directly abut the stabilizing material 71.

The stabilizing mechanism 900 allows any tipping forces acting upon mounting platform to be translated to the stabilizing material 71 such that the weight of the stabilizing material 71 substantially prevents an actual tipping of the mounting platform and/or camera mounted thereon.

It is noted that the rivets 920 may be recessed into the stabilizing mechanism 900.

The camera supporting base also includes a lower cover 64. It is noted that the lower cover 64 may be made of rubber textured to be resistant to skidding and slipping. It is also noted that the upper cover 61 and lower cover 64 may be sewn together.

Figure 38:
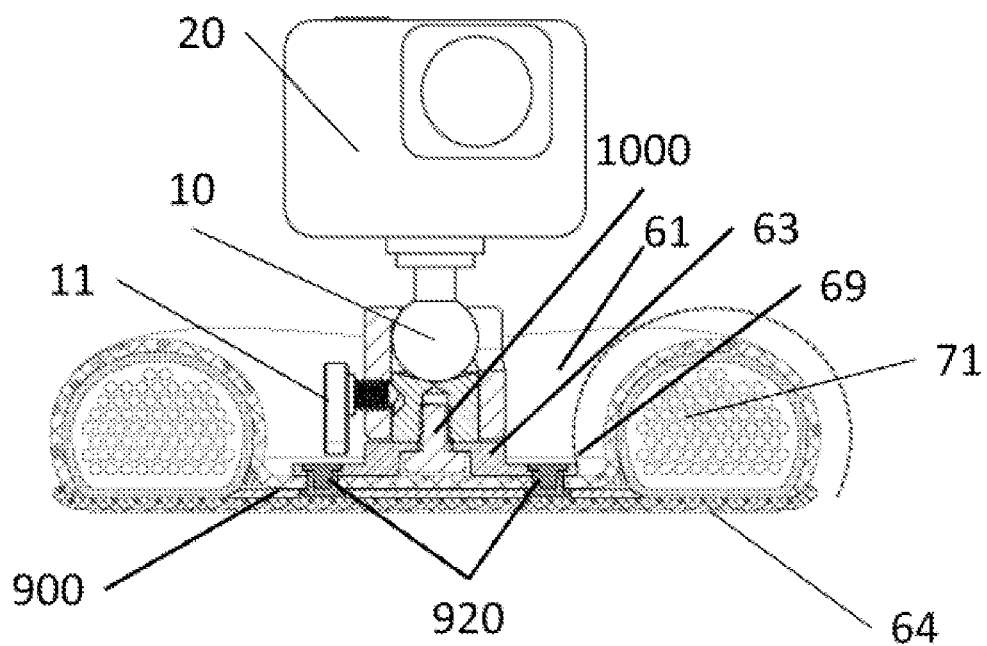
FIG. 38 shows another cut-away view of the camera supporting base of FIG. 37 with a camera mounted thereon.

FIG. 38 shows another cut-away view of the camera supporting base of FIG. 37 with a camera mounted thereon.

As illustrated in FIG. 38, an attachment mechanism 1000 is seated in the mounting platform. The mounting platform is secured to the upper cover 61 by rivets 920 engaging the recessed holes 92 of the mounting platform.

As illustrated in FIG. 38, the mounting platform and a stabilizing mechanism 900 sandwich the upper cover 61. The stabilizing mechanism 900 may be wedged under or may directly abut the stabilizing material 71.

The stabilizing mechanism 900 allows any tipping forces acting upon mounting platform to be translated to the stabilizing material 71 such that the weight of the stabilizing material 71 substantially prevents an actual tipping of the camera mounted 20 thereon.

It is noted that the rivets 920 may be recessed into the stabilizing mechanism 900.

The camera supporting base also includes a lower cover 64. It is noted that the lower cover 64 may be made of rubber textured to be resistant to skidding and slipping. It is also noted that the upper cover 61 and lower cover 64 may be sewn together.

It is noted, as illustrated in FIG. 38, a lever 11 for the camera mount is provided enough clearance for operation due to the bi-level nature of the mounting platform.

In the various embodiments described above, it is noted that the stabilizing mechanism may be glued to the upper cover of the camera supporting base. Alternatively, the stabilizing mechanism may be fused to the upper cover of the camera supporting base.

In addition, in the various embodiments described above, it is noted that the mounting surface (level) and/or the combination of the mounting surface (level) and the attachment mechanism have a dimensional height such that when a camera mount is fully engaged with the attachment mechanism, there is enough clearance from the bottom of the camera mount to the upper cover of the camera supporting base to enable unimpeded operation of a lever of the camera mount.

Furthermore, in the various embodiments described above, it is noted that the lever of the camera mount may be, alternatively, a wing screw, a knurled knob, or other camera mount mechanism. In these alternative embodiments, it is noted that the mounting surface (level) and/or the combination of the mounting surface (level) and the attachment mechanism have a dimensional height such that when a camera mount is fully engaged with the attachment mechanism, there is enough clearance from the bottom of the camera mount to the upper cover of the camera supporting base to enable unimpeded operation of a camera mount mechanism of the camera mount.

Also, in the various embodiments described above, it is noted that the mounting surface (level) and/or the combination of the mounting surface (level) and the attachment mechanism have a dimensional height such that when a camera mount is fully engaged with the attachment mechanism, there is enough clearance from the bottom of the camera mount to the upper cover of the camera supporting base to create a recess enabling components of the camera or camera mount protruding below the mounting surface to be operated without impediment.

In summary, the camera base mount consists of a mounting platform, the platform attached to and recessed into a surrounding stabilizing mass.

The stabilizing mass consists of a material or mixture of materials allowing for sufficient pliability for conforming to irregular surfaces and allowing for sufficient weight to maintain stability under conditions of vibration and movement.

The recessed area between the mounting surface of the mounting platform and the stabilizing mass forms a valley giving room for components of the item being mounted to the mounting surface, which protrude below the mounting surface, to be operated without impediments.

The mounting platform is formed as a pedestal with two levels and a recess area or volume, with the mounting surface being raised above and non-coplanar with the lower surface of the mounting platform to enable the components of the item being mounted to the mounting surface, which protrude below the mounting surface, to be operated without impediments.

The mounting platform may be rigid.

The mounting platform may have multiple steps or levels.

The stabilizing mass may be contained within two or more flexible elements.

The flexible element on the side of the support base opposite the mounting side may be made of material with anti-skid properties.

A camera supporting base comprises a mounting platform and a pliable mass surrounding the mounting platform, the mounting platform having a bi-level configuration formed by a mounting surface and a lower surface, the mounting surface being raised above the lower level, the mounting surface being non-coplanar with the lower surface to create a recess.

The mounting surface of the mounting platform may be recessed below a highest contour of the pliable mass. The lower surface may comprise multiple lower surfaces radiating out from the mounting surface.

The mounting surface and the lower surface may form a step to create a recess enabling components of the camera protruding below the mounting surface to be operated without impediment.

The pliable mass may include a pliable material for conforming to irregular surfaces and the pliable mass providing stability under conditions of vibration and movement.

The mounting surface may include an attachment mechanism for mounting a camera thereto. The mounting platform may be rigid.

The camera supporting base may further comprises an outer shell having a first outer shell member for attaching the mounting platform to the outer shell and a second outer shell member. The mounting platform may be riveted to the first outer shell member. The outer shell may be pliable.

The second outer shell member may include slip resistant material. The second outer shell member may include slip resistant texture. The outer shell may be a fabric material.

The pliable mass may be contained within a flexible tube, the flexible tube being contained in the outer shell.

The camera supporting base may further comprise a stabilizing member located between the first outer shell member and the second outer shell member; the mounting platform being attached to the first outer shell member and the stabilizing member using screws.

A camera supporting base comprises a mounting platform; the mounting platform having a bi-level configuration formed by a mounting surface and a lower surface; the mounting surface being raised above the lower level; the mounting surface being non-coplanar with the lower surface to create a recess.

The lower surface may comprise multiple lower surfaces radiating out from the mounting surface. The mounting surface and the lower surface may form a step to create a recess enabling components of the camera protruding below the mounting surface to be operated without impediment.

The mounting surface may include an attachment mechanism for mounting a camera thereto. The mounting platform may be rigid.

A camera supporting base comprises an upper cover; a lower cover; a mounting platform; a pliable stabilizing mass surrounding the mounting platform; and a stabilizing member; the mounting platform having a bi-level configuration formed by a mounting surface and a lower surface; the mounting surface being raised above the lower level; the mounting surface being non-coplanar with the lower surface to create a recess; the stabilizing member being attached to the mounting platform.

The mounting surface of the mounting platform may be recessed below a highest contour of the pliable stabilizing mass.

The lower surface may comprise multiple lower surfaces radiating out from the mounting surface.

The mounting surface and the lower surface may form a step to create a recess enabling components of the camera protruding below the mounting surface to be operated without impediment.

A portion of the upper cover may be sandwiched between the mounting platform and the stabilizing member.

A portion of the stabilizing member may be wedged under the pliable stabilizing mass.

A portion of the stabilizing member may abut the pliable stabilizing mass.

The mounting platform may be riveted to the stabilizing member.

The mounting platform may be screwed to the stabilizing member.

The pliable stabilizing mass may be contained within a flexible tube, the flexible tube being contained by the upper cover and the lower cover.

A camera supporting base comprises an upper cover; a lower cover; a mounting platform having a mounting surface; a pliable stabilizing mass surrounding the mounting platform; and an attachment mechanism; the attachment mechanism having a dimensional length raised above the mounting platform such that when a camera mount fully engages the attachment mechanism, a clearance from a bottom of the camera mount to the mounting surface of the mounting platform enables unimpeded operation of components of the camera or camera mount protruding below the mounting surface.

The mounting platform may comprise multiple co-planar members radiating out from the mounting surface.

The camera supporting base may further comprise a stabilizing member, the stabilizing member being attached to the mounting platform.

A portion of the upper cover may be sandwiched between the mounting platform and the stabilizing member.

A portion of the stabilizing member may be wedged under the pliable stabilizing mass.

A portion of the stabilizing member may abut the pliable stabilizing mass.

The mounting platform may be riveted to the stabilizing member.

The mounting platform may be screwed to the stabilizing member.

The pliable stabilizing mass may be contained within a flexible tube, the flexible tube being contained by the upper cover and the lower cover.

A camera supporting base comprises an upper cover; a lower cover; a mounting platform; a pliable stabilizing mass surrounding the mounting platform; and an attachment mechanism; the mounting platform having a dimensional height above the upper cover such that when a camera mount fully engages the attachment mechanism, a clearance from a bottom of the camera mount to the upper cover enables unimpeded operation of components of the camera or camera mount protruding below the mounting surface.

The mounting platform may be cylindrically shaped.

The camera supporting base may further comprise a stabilizing member, the stabilizing member being attached to the mounting platform.

A portion of the upper cover may be sandwiched between the mounting platform and the stabilizing member.

A portion of the stabilizing member may be wedged under the pliable stabilizing mass.

A portion of the stabilizing member may abut the pliable stabilizing mass.

The mounting platform may be riveted to the stabilizing member.

The mounting platform may be screwed to the stabilizing member.

The pliable stabilizing mass may be contained within a flexible tube, the flexible tube being contained by the upper cover and the lower cover.

An electronic device supporting base comprises a rigid mounting platform; a stabilizing member connected to the rigid mounting platform; and a pliable stabilizing mass surrounding the rigid mounting platform; the rigid mounting platform having a mounting surface and a lower surface; the rigid mounting platform including an attachment mechanism for attaching an electronic device thereto; the stabilizing member being connected to the lower surface of the rigid mounting platform; the stabilizing member having a portion thereof being wedged under a portion of the pliable stabilizing mass.

The electronic device supporting base may include an outer shell having a first outer shell member for attaching the mounting platform to the outer shell and a second outer shell member.

The mounting platform may be riveted to the first outer shell member.

The second outer shell member may include slip resistant material.

The pliable stabilizing mass may be contained within a flexible tube, the flexible tube being contained in the outer shell.

The lower surface of the rigid mounting platform may have multiple connecting recesses for receiving connecting mechanisms.

The stabilizing mechanism may have multiple connecting mechanism recesses for receiving the connecting mechanisms.

A camera supporting base comprises an upper cover; a lower cover; a mounting platform having a mounting surface; a pliable stabilizing mass surrounding the mounting platform; and an attachment mechanism; the mounting platform having a dimensional height above the upper cover such that when a camera mount fully engages the attachment mechanism, a clearance from a bottom of the camera mount to the upper cover enables unimpeded operation of a lever of the camera mount.

The mounting platform may include multiple co-planar members radiating out from the mounting surface.

The camera supporting base may include a stabilizing member, the stabilizing member being attached to the mounting platform.

A portion of the upper cover may be sandwiched between the mounting platform and the stabilizing member.

A portion of the stabilizing member may be wedged under the pliable stabilizing mass.

A portion of the stabilizing member may abut the pliable stabilizing mass.

The mounting platform may be riveted to the stabilizing member.

The mounting platform may be screwed to the stabilizing member.

The pliable stabilizing mass may be contained within a flexible tube, the flexible tube being contained by the upper cover and the lower cover.

A camera supporting base comprises a mounting platform; and an attachment mechanism for mounting a camera thereto; the mounting platform having a mounting surface and a lower surface; the lower surface including attachment recesses; the mounting platform having a dimensional height such that when a camera mount fully engages the attachment mechanism, a dimensional distance from a bottom of the camera mount to the lower surface of the mounting platform enables unimpeded operation of a lever of the camera mount.

The mounting platform may be rigid.

It will be appreciated that the above-disclosed embodiment and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. An electronic device supporting base, comprising:
   an integral mounting platform;
   said integral mounting platform having a bi-level configuration formed by a mounting level and a lower level;
   said mounting level being raised above said lower level;
   said mounting level being parallel and non-coplanar with said lower level to create a recess;
   said lower level having an upper surface and a lower surface;
   said lower level having attachment recesses configured to receive attachment mechanisms;
   said lower surface of said lower level having a recess configured to receive an accessory attachment mechanism, said recess being shaped to prevent an accessory attachment mechanism from rotating when an accessory attachment mechanism is located therein.

2. The electronic device supporting base, as claimed in claim 1, wherein said attachment recesses are bi-diameter attachment through-holes configured to receive attachment mechanisms.

3. The electronic device supporting base, as claimed in claim 1, wherein said lower level has a plurality of lower surface projections, each lower surface projection having one of said attachment recesses.

4. An electronic device supporting base, comprising:
   a mounting platform; and
   an accessory attachment mechanism;
   said mounting platform having a bi-level configuration formed by a mounting level and a lower level;
   said mounting level being raised above said lower level;
   said mounting level being parallel and non-coplanar with said lower level to create a recess;
   said lower level having an upper surface and a lower surface;
   said lower level having attachment recesses configured to receive attachment mechanisms;
   said mounting level having a mounting surface;
   said accessory attachment mechanism projecting from said mounting surface of said mounting level.

5. The electronic device supporting base, as claimed in claim 4, wherein said attachment recesses are bi-diameter attachment through-holes configured to receive attachment mechanisms.

6. The electronic device supporting base, as claimed in claim 4, wherein said lower level has a plurality of lower surface projections, each lower surface projection having one of said attachment recesses.

7. An electronic device supporting base, comprising:
   a mounting platform;
   said mounting platform having a mounting surface and a lower surface;
   said mounting platform having attachment recesses configured to receive attachment mechanisms;
   said mounting platform having a recess configured to receive an accessory attachment mechanism, said recess being shaped to prevent an accessory attachment mechanism from rotating when an accessory attachment mechanism is located therein.

8. The electronic device supporting base, as claimed in claim 7, wherein said attachment recesses are bi-diameter attachment through-holes configured to receive attachment mechanisms.

9. The electronic device supporting base, as claimed in claim 7, wherein said lower surface of said mounting platform has a plurality of lower surface projections, each lower surface projection having one of said attachment recesses.

* * * * *